United States Patent [19]
Thompson et al.

[11] Patent Number: 5,958,354
[45] Date of Patent: Sep. 28, 1999

[54] ALUMINOSILICATE CATION EXCHANGE COMPOUNDS

[76] Inventors: John Gerard Thompson, 15 Luehmann Street, Page, Australian Capital Territory, 2614; Sasha Koun, 64 Mackella Crescent, Cook, Australian Capital Territory, 2614; Raymond Leslie Withers, 24 Anembo Street, Narrabundah, Australian Capital Territory, 2604; Stephen Ronald Palethorpe, 4/2 Sexton Street, Cook, Australian Capital Territory, 2614, all of Australia

[21] Appl. No.: 08/817,756
[22] PCT Filed: May 30, 1995
[86] PCT No.: PCT/AU95/00320
    § 371 Date: Jul. 23, 1997
    § 102(e) Date: Jul. 23, 1997
[87] PCT Pub. No.: WO96/12674
    PCT Pub. Date: May 2, 1996

Related U.S. Application Data

[30] Foreign Application Priority Data

Oct. 25, 1994 [AU] Australia .............................. PM9006/94
Dec. 16, 1994 [AU] Australia .............................. PN0118/94

[51] Int. Cl.⁶ .................................................. C01B 33/26
[52] U.S. Cl. ..................................... 423/328.1; 423/328.2
[58] Field of Search .............................. 423/328.1, 328.2

[56] References Cited

U.S. PATENT DOCUMENTS 3,586,523  6/1971  Fanselow et al. .................. 106/288 B
3,663,456  5/1972  Upson ................................. 252/455 Z

FOREIGN PATENT DOCUMENTS

73756/87   1/1988   Australia .
1181491    2/1970   United Kingdom .
91/18833   12/1991  WIPO .
95/00441   1/1995   WIPO .
96/18576   6/1996   WIPO .
96/18577   6/1996   WIPO .

OTHER PUBLICATIONS

Natale et al., "Solid State Reaction of Sodium Carbonate with Montmorillonite at 550° C. ," *Chemical Abstracts*, 110(19):685 (Abstract No.: 172201x (1989)(No Month).

Natale et al., "Solid State Reaction of Sodium Carbonate with Montmorillonite at 550° C.," *Clays Clay Miner.*, 37(1):89–95 (1989)(No Month).

(List continued on next page.)

*Primary Examiner*—Mark L. Bell
*Assistant Examiner*—David Sample
*Attorney, Agent, or Firm*—David J. Brezner; Walter H. Dreger; Flehr Hohbach Test Albritton & Herbert LLP

[57] ABSTRACT

Poorly or partly crystalline alkali metal aluminosilicate materials have stuffed silica polymorph related-structures in which the aluminium is at least predominantly tetrahedrally coordinated and cation exchange capacities at room temperature of at least 1 meq 100 $g^{-1}$ in aqueous solution. The materials are produced by reacting an aluminosilicate, or a combination of aluminium oxide-containing and silicon oxide-containing compounds, with an alkali oxide-containing reagent. Preferably the reaction is a solid state reaction. Specific surfaces of the material are likely to be less than 45 $m^2g^{-1}$. The preferred aluminosilicate reactants are kaolin group minerals.

22 Claims, 15 Drawing Sheets tridymite kalsilite

● silicon     ○ oxygen
○ aluminium   ⊙ oxygen (double density)
⊕ potassium

OTHER PUBLICATIONS

MacKenzie et al., "Outstanding Problems in the Kaolinite–Mullite Reaction Sequence Investigated by $^{29}$Si and $^{27}$Al Solid–State Nuclear Magnetic Resonance: I, Metakaolinite," *Journal of the American Ceramic Society*, 68(6):293–297 (1985)(No Month).

Lambert et al., "Revisiting Kaolinite Dehydroxylation: A $^{29}$Si and $^{27}$Al MAS NMR Study," *J. Am. Chem. Soc.*, 111:3517–3522 (1989)(No Month).

Berchot et al., "Ion Exchange Properties of β–Eucryptite (LiAlSiO$_4$): EPR Investigation on Copper–Doped Single Crystals," *Journal of Solid State Chemistry*, 34:199–205 (1980)(No Month).

Buerger, "The Stuffed Derivatives of the Silica Structures," *American Mineralogist*, 39:600–614 (1954)(No Month).

Dondur et al., "High Temperature Transformations of NH$_4$A Zeolite", *Thermochimica Acta*, 93:753–756 (1985)(No Month).

Goodenough et al., "Fast Na$^+$–Ion Transport In Skeleton Structures," *Mat. Res. Bull.*, 11:203–220 (1976)(No Month).

Kubo et al., "Reaction Processes to Form Nepheline–Carnegieite Minerals from Various Starting Materials," *Mineralogical Journal*, 5(3):213–223 (1967)(No Month).

Murat, "Thermal Evolution of Type 4A Synthetic Zeolites. Influence of Composition on Heterogeneities on the Manifestation of Exothermic Effects at 800–1000° C.," *Journal of Thermal Analysis*, 4:73–81 (1972)(No Month).

Petranovic et al., "Kinetic Study of Phase Transition in the System LiAlSiO$_4$," *Ceramics Today—Tomorrow's Ceramics*, pp. 2229–2236 (1991)(No Month).

Roux, "Eqilibrium of the Exchange Reaction of Sodium––Potassium Ions in Nepheline at 600° C. and 2000bar," *C.R. Acad. Sci. Ser. D*, 272:3225–3227 (1971)(No Month).

Schairer, "Melting Relations of the Common Rock–Forming Oxides," *Journal of the American Ceramic Society*, 40(7):215–230 (1957)(Jul.)

Schmitz et al., "Thermal Decomposition of Partially Mg$^{2+}$–Exchanged Forms of Zeolite A Investigated by DTA–and X–Ray High Temperature Methods," *Crystal Research and Technology*, 16(3):385–389 (1981)(No Month).

Shannon, "Ionic Conductivity in Sodium Magnesium Silicates," *Phys. Chem. Minerals*, 4:139–148 (1979)(No Month).

Shannon and Berzins, "Ionic Conductivity in Low Carnegieite Compositions Based on NaAlSiO$_4$," *Materials Research Bulletin*, 14:361–367 (1979)(No Month).

Sobrados and Gregorkiewitz, "Ion Exchange Between Tectosilicates with the Nephelin–Kalsilite Framework and Molten MNO$_3$ or Mcl (M–Li, Na, K, Ag)," *Phys. Chem. Minerals*, 20:433–441 (1993)(No Month).

West, *Solid State Chemistry and its Applications*, pp. 5–7 No Date.

Thompson et al., "The Intercalation of Kaolinite by Alkali Halides in the Solid State: A Systematic Study of the Intercalates and Their Derivatives," *Clays and Clay Minerals*, 41(1):73–86 (1993)(No Month).

Thompson et al., "Structural Characterisation of Kaolinite:NaCl Intercalate and Its Derivatives," *Clays and Clay Minerals*, 40(4):369–380 (1992)(No Month).

Heller–Kallai, "Reaction of Salts with Kaolinite at Elevated Temperatures," *Clay Minerals*, 13:221–235 (1978)(No Month).

Gabor et al., "Interaction of Kaolinite with Organic and Inorganic Alkali Metal Salts at 25–1300° C.," *Thermochimica Acta*, 128:431–438 (1989)(No Month).

Brindley, "Thermal Transformations of Clays and Layer Silicates," *Proceedings of teh International Clay Conference*, Applied Publishing: Illinois, pp. 119–129 (1975)(No Month).

Rocha and Klinowski, "$^{29}$Si and $^{27}$Al Magic–Angle–Spinning NMR Studies of the Thermal Transformation of Kaolinite," *Phys. Chem. Minerals*, 17:179–186 (1990)(No Month).

Meinhold et al., "Thermal Reactions of Kaolinite Studied by Solid State 27–Al and 29–Si NMR," *Journal of Materials Science Letters*, 4:163–166 (1985)(No Month).

ALUMINOSILICATE CATION EXCHANGE COMPOUNDS

TECHNICAL FIELD

This invention relates to aluminosilicate compounds which have cation exchange capacity and is particularly concerned with such materials having a stuffed silica polymorph-related structure in which the aluminium is tetrahedrally coordinated.

BACKGROUND ART

Kalsilite, nepheline, carnegieite and eucryptite are all crystalline minerals of ideal composition $MAlSiO_4$, where M is an alkali metal, having a stuffed silica polymorph-related structure in which the aluminium is tetrahedrally coordinated.

Kalsilite has ideal composition $KAlSiO_4$, while nepheline exists as a solid-solution and has the composition $Na_{1-x}K_xAlSiO_4$, where $0 \leq x < 1$. Both of these minerals have crystal structures closely related to that of the silica polymorph, tridymite (see FIG. 1). Carnegieite has ideal composition $NaAlSiO_4$ and has a crystal structure closely related to that of the silica polymorph, cristobalite (see FIG. 2). Eucryptite has ideal composition $LiAlSiO_4$ and has a crystal structure closely related to that of the silica polymorph, quartz (see FIG. 3).

Tridymite, cristobalite and quartz all have the composition $SiO_2$ and consist of a 3-dimensional framework of corner-connected $SiO_4$ tetrahedra. Kalsilite, nepheline, carnegieite and eucryptite have been described as stuffed derivatives of the tridymite, cristobalite or quartz structures, in that half of the silica cations in the silicate framework in each case are replaced by aluminium cations. Alkali cations, which are required for charge balance ($Si^{4+} \longleftrightarrow Al^{3+} + M^+$, M=alkali) occupy the interstices in the respective frameworks (see FIGS. 1–3)—hence the descriptions "stuffed tridymite", "stuffed cristobalite", and "stuffed quartz".

In kalsilite, nepheline, carnegieite andeucryptite, the interstitial cations, $M^+$, are not exchangeable under normal conditions, that is, in aqueous salt solution at atmospheric pressure up to –100° C. Therefore, kalsilite, nepheline, carnegieite and eucryptite have negligible cation exchange capacity (CEC). Any CEC is associated with the surface of crystals and not the bulk of the structure.

It has been proposed in, for example, Roux, J., 1971, C. R. Acad. Sci., Ser. D 272, 3225–3227 to exchange the interstitial cations of kalsilite and related aluminosilicates by treating the material at high temperature and pressure under hydrothermal conditions.

It has also been proposed by Sobrados & Gregorkiewitz, 1993, Physics and Chemistry of Minerals, 20, 433–441 to achieve similar exchange of cations by treating kalsilite and related materials with molten salts such as $MNO_3$ or MCl (M=Li, Na, K, Ag).

However, it is widely accepted that aluminosilicates with the stuffed tridymite-type structure have no cation exchange capacity associated with the bulk structure, either in aqueous solution or in organic solvents.

It has been proposed in, for example, Petranovic et al, 1991, Materials Science Monograph, 666, 2229–2236, that it is possible to exchange the interstitial $Na^+$ cation of carnegieite with $Li^+$ by treating it with molten $LiNO_3$. Associated with this ability to exchange cations by treatment with molten salts is the property of ionic conductivity which has been observed for carnegieite and related materials.

It is also expected that, as for kalsilite and nepheline, exchange of the interstitial cations might be induced under aqueous conditions provided that the material were subjected to sufficiently high temperatures and pressures, i.e. under hydrothermal conditions.

However, it is widely accepted that aluminosilicates with the stuffed cristobalite-type structure have no cation exchange capacity associated with the bulk structure, either in aqueous solution or in organic solvents.

It has been proposed in, for example, Berchot et al, 1980, Journal of Solid State Chemistry, 34, 199–205, that while it is not possible to substitute $Li^+$ in β-eucryptite by treatment using molten salts with bigger cations such as $Na^+$, K+ or $Ag^+$, exchange by divalent cations $Cu^{2+}$ and $Mn^{2+}$ is possible under such conditions.

However, it is widely accepted that aluminosilicates with the stuffed quartz-type structure have no cation exchange capacity associated with the bulk structure, either in aqueous solution or in organic solvents.

Amorphous derivatives of kaolinite and/or halloysite having large surface areas (BET surface area of at least 45 $m^2 g^{-1}$) and cation exchange capacity are described in International patent application WO95/00441 and related applications (including in the United States of America), the contents of which are incorporated herein by reference.

In WO95/00441 the amorphous derivatives of kaolinite and/or halloysite (referred to as "KAD") are produced by a process which comprises reacting a kaolin group mineral with an aqueous alkali halide, wherein the mole ratio of alkali metal halide to the kaolin group mineral is from 5 to the saturation concentration of the alkali metal halide. KAD is characterised as a result of this production process by the presence of halide and substantial amounts of structural water, whether as bound water or as hydroxyl, in its composition.

SUMMARY OF THE INVENTION

According to the present invention there is provided a poorly or partly crystalline alkali metal aluminosilicate material having a stuffed silica polymorph-related structure in which the aluminium is predominantly tetrahedrally coordinated and a cation exchange capacity (CEC) at room temperature of at least 1 meq 100 $g^{-1}$ in aqueous solution, which is produced by reacting an aluminosilicate, or a combination of aluminium oxide-containing and silicon oxide-containing compounds, with an alkali oxide-containing reagent. Compounds in accordance with the invention are, for convenience only, hereinafter collectively referred to as XAM.

Also according to the present invention, there is provided a process for the preparation of a poorly or partly crystalline alkali metal aluminosilicate material having a stuffed silica polymorph related-structure in which the aluminium is predominantly tetrahedrally coordinated and a cation exchange capacity at room temperature of at least 1 meq 100 $g^{-1}$ in aqueous solution, in which an aluminosilicate, or a combination of aluminium oxide-containing and silicon oxide-containing compounds, are reacted together with an alkali oxide-containing reagent.

Further, the present invention extends to uses of XAM and/or of XAM which has been subjected to partial or full exchange of the alkali metal cation.

By stuffed silica polymorph-related structure is meant any alkali metal aluminosilicate material with the structure type of any of the stuffed silica polymorphs defined above. The interstitial cation may therefore be $K^+$, $Na^+$, or $Li^+$, as in kalsilite, carnegieite, or eucryptite, respectively. When XAM is prepared with $K^+$ as the interstitial cation a kalsilite-related structure is obtained, when prepared with $Na^+$ a carnegieite-related structure is obtained, and when prepared with $Li^+$ a eucryptite-related structure is obtained. XAM may be prepared with other alkali cations, $Rb^+$ and $Cs^+$, in which cases kalsilite-related structures are obtained. The interstitial sites in XAM may also be occupied by a mixture of two or more such cations, as in nepheline, or a mixture of alkali metal and one or more other cations, such as transition metal cations and alkaline earth cations. XAMs involving mixtures of interstitital cations typically possess the stuffed silica polymorph-related structure of the dominant interstitital cation. Alkali metal cations are the preferred cations, in particular $K^+$, $Na^+$ and $Li^+$.

Central to the present invention is the discovery that XAM can have a significant CEC in aqueous solution at room temperature. XAM preferably has a CEC of at least 5 milliequivalents per 100 grams (meq 100 $g^{-1}$), most preferably greater than 10 meq 100 $g^{-1}$, and in many embodiments will have a CEC of at least 100 meq 100 $g^{-1}$. When well-prepared, XAM may have a CEC$\geq$250 meq 100 $g^{-1}$, for example up to 750 meq 100 $g^{-1}$, with a significant majority of the interstitial cation being exchangeable by other cations in aqueous solution at room-temperature. This discovery is in contrast to the properties of well-crystallised, ordered kalsilite-, nepheline-, carnegieite-, and eucryptite-type aluminosilicates which have CECs typically less than 1 meq 100 $g^{-1}$ per 100 grams.

XAM can be prepared by a large number of synthetic processes preferably involving solid state reactions, and several of these processes are described below. Essential to the synthesis of XAM are reactive starting materials, that is, components or component precursors which facilitate reaction at relatively low temperatures. More rigorous conditions normally associated with the formation of aluminosilicates such as kalsilite and carnegieite, for example, annealing components at $\geq 1000°$ C. overnight, produce materials which do not display the cation exchange properties of XAM, and which are normally well-crystallised and ordered.

To facilitate relatively mild reaction conditions for the formations of XAM it is advantageous to use an aluminosilicate starting material which, by definition, contains aluminium and silicon cations mixed on the unit cell, that is the nanometer, scale.

Aluminosilicate phyllosilicates are, in general, suitable reactive starting materials for the formation of XAM. Such phyllosilicates include the clay minerals, illite, vermiculite, montmorillonite, beidellite, bentonite, kaolinite and halloysite, as well as the minerals, pyrophyllite, muscovite and palygorskite. While there is a significant range in the silicon and aluminium contents among these starting materials, all are considered, to a greater to lesser extent, to be a suitable source of aluminosilicate in the synthesis of XAM. Other aluminosilicate minerals such as zeolites, imogolite and allophane, are also considered suitable.

One of the other advantages that mineral aluminosilicates have as reactive starting materials is their high natural abundance and low unit cost.

Various alkali salts and hydroxides are suitably reactive starting materials which provide a source of the alkali cations. Most alkali salts which decompose upon heating at a temperature up to 1000° C. to give alkali oxide are suitable. The most preferred salts are carbonates. Other preferred salts are bicarbonates, nitrates and carboxylates.

It is also possible to use reactive forms of silica, such as silica gel and colloidal silica, in combination with reactive forms of alumina, such as aluminium nitrate nonahydrate, bayerite and aluminium hydroxide gel, to provide the source of aluminosilicate for the formation of XAM. Alternatively, possible combinations of reactive starting materials are sodium nitrate or sodium carbonate with aluminosilicic gel, and gibbsite or boehmite with sodium silicate glass.

Preferred reaction conditions are 750° C. or less, for example 300° C. to 750° C. at atmospheric pressure for periods of time of, for example, 15 minutes to 24 hours. Reaction in air in an open vessel is preferred, but the reaction will proceed until different atmospheres and/or under reduced pressure provided the system is not closed.

BRIEF DESCRIPTION OF THE DRAWINGS

Various embodiments of XAMs, uses for the and processes for producing them will now be described by way of example only with reference to the accompanying drawings, in which:

FIGS. 8f and 8c show the evolution of the broad composite peak between −18° and −25° 2θ into the sharp 100 and 102 reflections of well-crystallised high-eucryptite at 1000° C. (peaks indicated by *). FIGS. 8a and 8b show XRD profiles of well-crystallised Cs- and Rb-containing kalsilite-related materials, respectively (peaks indicated by ★ and +, respectively);

FIG. 14 shows XRD profiles of Na-XAMs prepared from colloidal silica, aluminium nitrate and sodium carbonate according to Example 21 at Al:Si ratios of 0.2:1.0 (d) and 2.0:1.0 (c). The XRD profiles of the same Na-XAMs heated at 1000° C. for 16 hours, 0.2:1.0 (b) and 2.0:1.0 (a) showing unchanged profiles are juxtaposed.

DETAILED DESCRIPTION OF THE INVENTION

Structure and composition of XAM

XAM is most uniquely characterised in terms of its structure and composition.

The structures of the various M-XAMs (M=alkali metal) are characterised most definitively by X-ray powder diffraction. When well prepared the various M-XAMs give X-ray powder diffraction profiles which display the broad diffraction peaks characteristic of the protocrystalline stuffed silica polymorphs. They are not amorphous, as their X-ray powder diffraction profiles display nascent diffraction peaks of the stuffed silica polymorphs. The diffraction profile in each case is primarily dependent on the alkali metal, M. The characteristic XRD profiles for the various M-XAMs can e seen in FIGS. 5–9.

Further verification that a material is XAM can be obtained by heating these poorly or partly crystalline materials at sufficiently high temperature for sufficient time that they become well-crystallised, for example, at 1000° C. for 16 hours. Provided the stoichiometry of the XAM is reasonably close to that of one of the ideal stuffed silica polymorphs, kalsilite, nepheline, carnegieite or eucryptite, namely MAlSiO4, M=alkali metal, then the dominant peaks in the XRD of the crystalline material will be characteristic of one of more of these polymorphs.

If the stoichiometry of the XAM is significantly different from one of the ideal stuffed silica polymorphs, then other crystalline phases, for example, albite, $NaAlSi_3O_8$ and leucite $KAlSi_2O_6$, can be observed (se FIGS. 12b and 12a, respectively). If the stoichiometry of the XAM is sufficiently exotic or the framework atoms not sufficiently homogeneous then it is possible that the poorly crystalline XAM will not transform into a more crystalline solid under these conditions (see FIGS. 15a and 15b).

Figure 4:
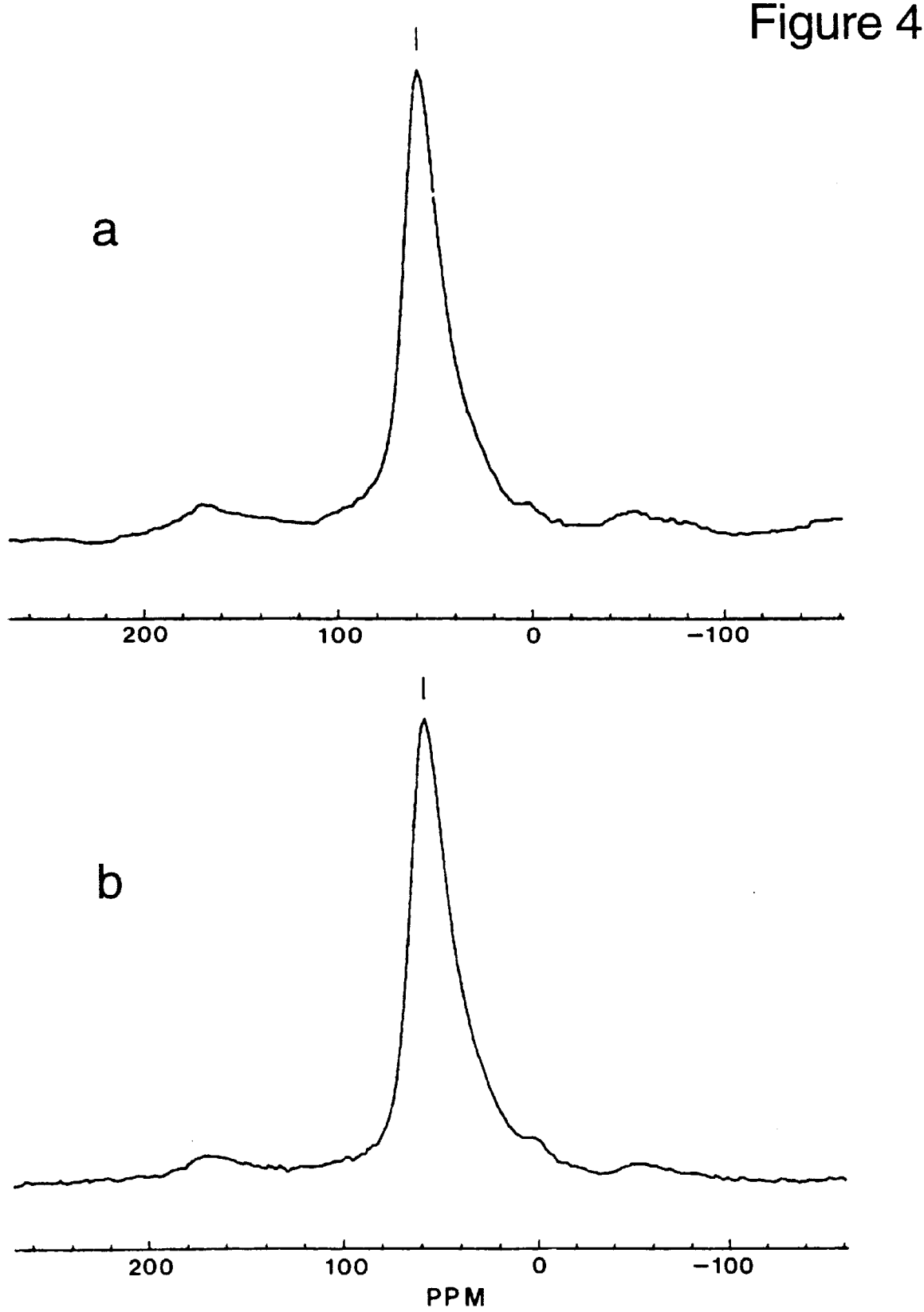
FIG. 4 shows $^{27}Al$ MAS NMR spectra collected at 104.228 MHz of a) K-XAM prepared according to a first process described below using kaolinite and $K_2CO_3$ heated for 3 hours at 500° C. (Example 2); and b) Na-XAM prepared according to the first process using kaolinite and $Na_2CO_3$ heated for 3 hours at 500° C. (Example 4)

Furthermore, as the structure of XAM is related to the stuffed silica polymorphs, it also comprises a framework aluminosilicate structure in which both the silicon and aluminium cations are tetrahedrally coordinated. $^{27}Al$ nuclear magnetic resonance (NMR) is sensitive to the coordination environment of aluminium, that is, whether the cation is 4, 5 or 6 coordinated. The $^{27}Al$ magic angle spinning (MAS) NMR spectra of K-XAM and Na-XAM prepared at 500° C. each give a single peak at −57 ppm (FWHM=−23 ppm) (see FIG. 4) which is interpreted as tetrahedrally coordinated aluminium. For these materials there is evidence of only very minor proportions ($\leq 3\%$) of octahedrally coordinated aluminium due possibly to unreacted starting material, kaolinite in which the aluminium is octahedrally coordinated, or to reaction byproducts or mineral impurities containing octahedrally coordinated aluminium.

The XRD profiles observed for XAMs are dependent on the choice of starting reagents and reaction conditions. They are also sometimes complicated by the presence of unreacted starting materials, reaction byproducts or impurity minerals, such as quartz and anatase, when naturally-occurring components are used.

Figure 1:
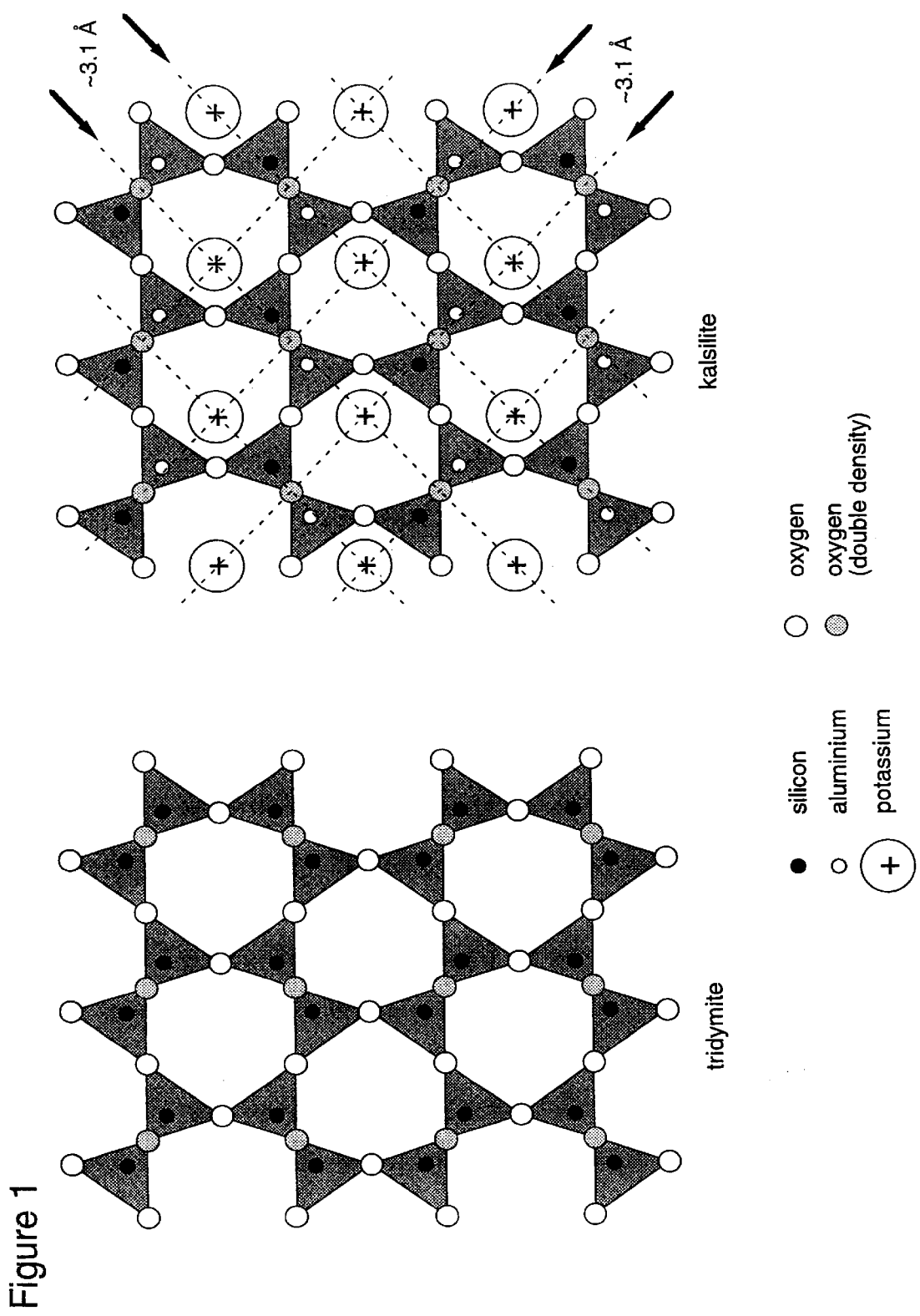
FIG. 1 shows polyhedral representations of high-tridymite ($SiO_2$) and kalsilite ($KAlSiO_4$), projected down the <110> direction. The structure of kalsilite shows the layers of interstitital and framework cations (dashed lines) which give rise to the strong X-ray diffraction (XRD) peak at –3.1 Å.

When K-XAM is poorly crystalline and free from unreacted starting material and reaction byproducts, its XRD profile comprises a single very broad diffraction peak (see FIGS. 5d and 6d). Which corresponds to the 102 reflection in kalsilite. This broad peak indicates that, while other long-range ordering is absent in these poorly crsytalline K-XAMs, there is still periodic structure (protocrystallinity) associated with the layers of interstitial and framework cations (refer to −3.1 Å layers indicated by dashed lines in FIG. 1). When heated at higher temperatures the K-XAM transforms into well-crystallised kalsilite and the resultant diffraction peaks can be indexed accordingly.

When Rb-XAM and Cs-XAM are poorly crystalline and free from unreacted starting material and reaction byproducts their XRD profiles (FIGS. 8e and 8d respectively) are dominated by a single very broad diffraction peak corresponding to the 202 reflections of their kalsilite-related structures (see Table 1). As for K-XAM these broad peaks are associated with slightly increased layer spacing due to the larger cation size. When heated at higher temperatures the Rb-XAM and Cs-XAM transform into well-crystallised kalsilite-related materials (FIGS. 8b and 8a respectively) and the resultant diffractions patterns can be indexed accordingly.

Figure 2:
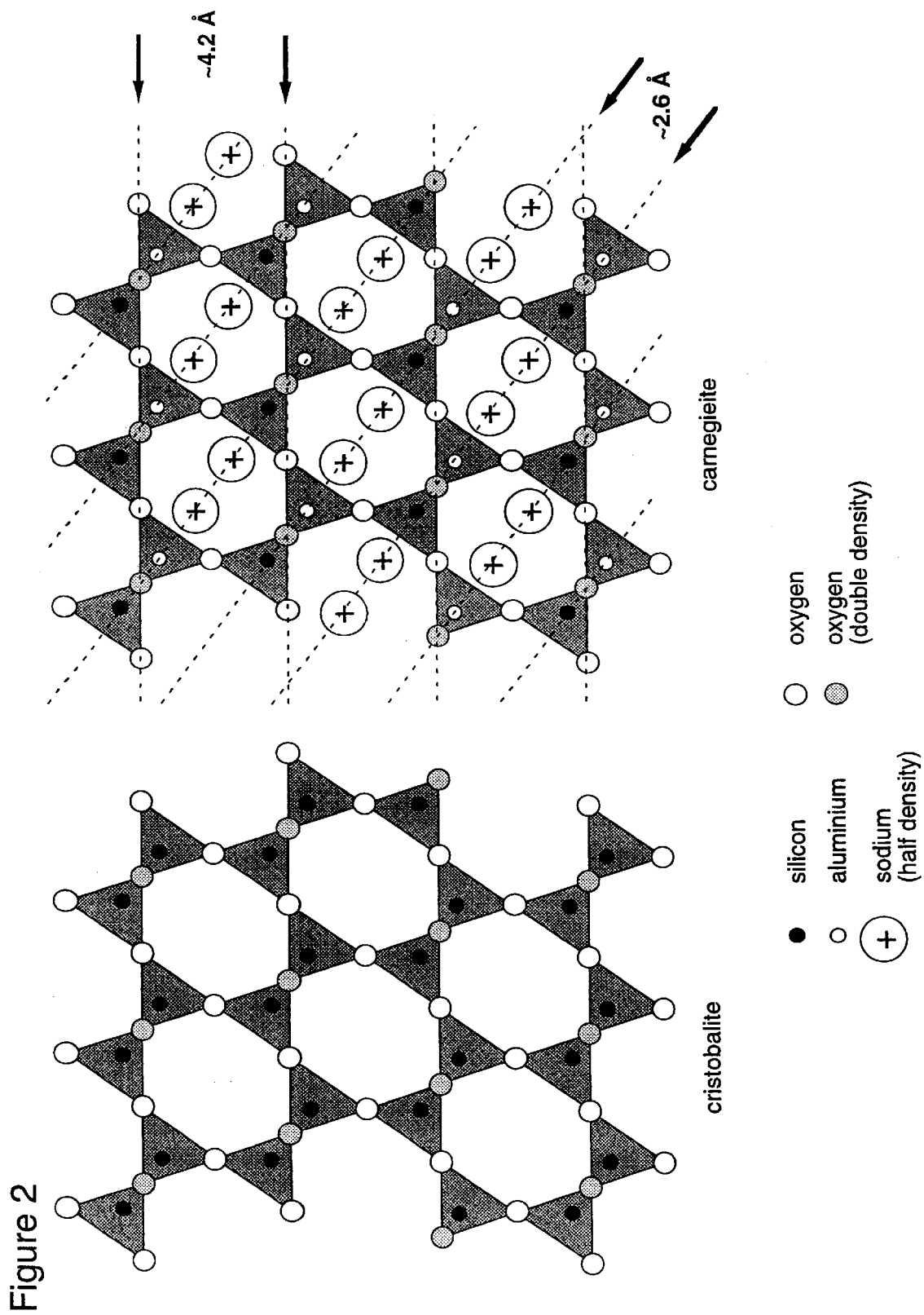
FIG. 2 shows polyhedral representations of high-cristobalite ($SiO_2$) and high-carnegieite ($NaAlSiO_4$), projected down the cubic <110> direction. The structure of high-carnegieite shows the layers of interstitial and framework cations (dashed lines) which give rise to the strong X-ray diffraction peaks at –4.2 –2.6 Å.

When Na-XAM is poorly crystalline and free from unreacted starting material and reaction byproducts its XRD profile comprises a composite of two overlapping broad diffraction peaks (see FIGS. 5c and 7e) which correspond to the 111 and 220 peaks of high-carnegieite. These broad peaks indicate that, while other long-range ordering is absent in these poorly crystalline Na-XAMs, there is still periodic structure (protocrystallinity) associated with the layers of interstitital and framework cations (refer to −4.2 and 2.6 Å layers indicated by dashed lines in FIG. 2). When heated at higher temperatures the peaks initially sharpen and other high-carnegieite peaks appear (see FIG. 7), then upon further heating the material begins to transform to well-crystallised nepheline and the resultant diffraction peaks can be indexed accordingly.

Figure 3:
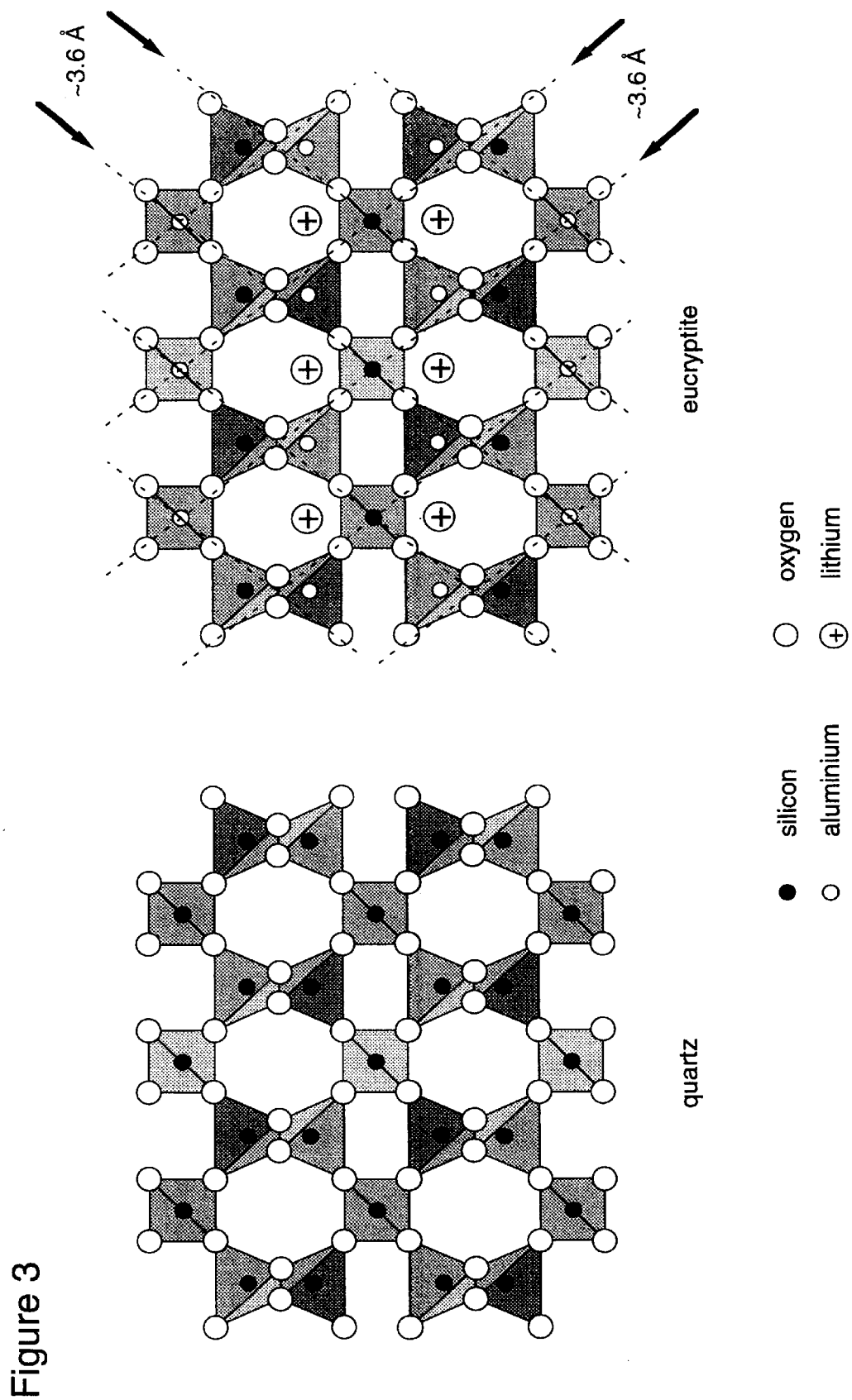
FIG. 3 shows polyhedral representations of high-quartz ($SiO_2$) and high-eucryptite ($LiAlSiO_4$), projected down the <110> direction. The structure of high-eucryptite shows the layers of interstitial and framework cations (dashed lines) which give rise to the strong X-ray diffraction peak at –3.6 Å.

When Li-XAM is poorly crsytalline and free from unreacted starting material and reaction byproducts its XRD profile comprises a composite of two broad overlapping diffraction peaks (see FIG. 8f) which corresponds to the 100 and 102 peaks of high-eucryptite. This broad composite peak indicates that, while other long-range ordering is absent in these poorly crystalline Li-XAMs, there is still periodic structure (protocrystallinity) associated with the layers of interstitial and framework cations (refer to −3.6 Å layers indicated by dashed lines in FIG. 3). When heated at higher temperatures the Li-XAM transforms into well-crystallised eucryptite and the resultant diffraction peaks can be indexed accordingly.

The d-spacings, relative intensities and derived unit cell dimensions for selected examples of these well-crystallised materials derived from Cs-XAM, Rb-XAM, K-XAM, Na-XAM and Li-XAM are listed in Table 1.

TABLE 1

Crystallographic data of well-crystallised materials derived from various XAMs in FIGS. 5–8

| Example 1 heated to 1000° C. Kalsilite | | | Example 2 heated to 1000° C. Kalsilite | | |
|---|---|---|---|---|---|
| d(Å) | I/I$_0$ | hkl | d(Å) | I/I$_0$ | hkl |
| 4.31 | 37 | 002 | 4.51 | 12 | 100 |
| 3.11 | 100 | 102 | 4.31 | 23 | 002 |
| 2.60 | 34 | 110 | 3.11 | 100 | 102 |
| 2.22 | 13 | 112 | 2.60 | 43 | 110 |
| 2.15 | 20 | 004 | 2.23 | 11 | 112 |
| 1.55 | 8 | 204 | 2.15 | 15 | 004 |
| Hexagonal a = 5.208(1) Å | | | Hexagonal a = 5.207(2) Å | | |
| c = 8.616(1) Å | | | c = 8.609(4) Å | | |

| Example 11 heated to 1000° C. Kalsilite-related | | | Example 10 heated to 1000° C. Kalsilite-related | | |
|---|---|---|---|---|---|
| d(Å) | I/I$_0$ | hkl | d(Å) | I/I$_0$ | hkl |
| 4.70 | 25 | 200 | 4.63 | 6 | 200 |
| 3.26 | 100 | 202 | 3.24 | 24 | 211 |
| 2.94 | 16 | 301 | 3.18 | 100 | 202 |

TABLE 1-continued

Crystallographic data of well-crystallised materials derived from various XAMs in FIGS. 5–8

| 2.71 | 28 | 310 | 2.79 | 8 | 103 |
|---|---|---|---|---|---|
| 2.32 | 20 | 022 | 2.67 | 27 | 310 |
| Orthorhombic a = 9.36(3) Å | | | 2.31 | 7 | 400 |
| b = 5.39(2) Å | | | 2.27 | 14 | 022 |
| c = 9.07(7) Å | | | 2.18 | 14 | 004 |
| | | | 1.98 | 6 | 114 |
| | | | 1.72 | 7 | 105 |
| | | | 1.54 | 8 | 330 |
| | | | Orthorhombic a = 9.249(4) Å | | |
| | | | b = 5.319(4) Å | | |
| | | | c = 8.767(3) Å | | |

| Example 3 heated to 1000° C. Nepheline | | | Example 4 heated to 1000° C. Nepheline | | |
|---|---|---|---|---|---|
| d(Å) | I/I$_0$ | hkl | d(Å) | I/I$_0$ | hkl |
| 8.70 | 5 | 100 | 8.65 | 9 | 100 |
| 5.00 | 12 | 110 | 4.99 | 15 | 110 |
| 4.34 | 59 | 200 | 4.32 | 39 | 200 |
| 4.17 | 90 | 002 | 4.17 | 80 | 002 |
| 3.84 | 98 | 201 | 3.84 | 100 | 201 |
| 3.27 | 59 | 210 | 3.27 | 72 | 210 |
| 3.05 | 21 | 211 | 3.04 | 16 | 211 |
| 3.00 | 100 | 202 | 3.00 | 89 | 202 |
| 2.88 | 36 | 300 | 2.88 | 39 | 300 |
| 2.57 | 19 | 212 | 2.57 | 23 | 212 |
| 2.50 | 17 | 220 | 2.50 | 13 | 220 |
| 2.40 | 14 | 310 | 2.40 | 10 | 310 |
| 2.34 | 42 | 203 | 2.34 | 45 | 203 |
| 2.31 | 26 | 311 | 2.30 | 25 | 311 |
| 2.12 | 12 | 213 | 2.12 | 11 | 213 |
| 2.08 | 17 | 004 | 2.08 | 18 | 004 |
| 1.79 | 10 | 322 | 1.79 | 6 | 322 |
| 1.56 | 20 | 205 | 1.56 | 17 | 205 |
| Hexagonal a = 10.000(3) Å | | | Hexagonal a = 9.979(1) Å | | |
| c = 8.341(3) Å | | | c = 8.336(2) Å | | |

| Example 4 heated to 800° C. High-carnegieite | | | Example 6 heated to 1000° C. High-eucryptite | | |
|---|---|---|---|---|---|
| d(Å) | I/I$_0$ | hkl | d(Å) | I/I$_0$ | hkl |
| 4.17 | 100 | 111 | 4.56 | 11 | 100 |
| 3.62 | 13 | 200 | 3.52 | 100 | 102 |
| 3.02 | 16 | — | 2.64 | 4 | 110 |
| 2.55 | 39 | 220 | 2.28 | 3 | 200 |
| 2.51 | 8 | — | 2.11 | 3 | 202 |
| 2.37 | 6 | — | 1.91 | 11 | 006 |
| 2.18 | 13 | 311 | 1.65 | 5 | 212 |
| 2.08 | 5 | 222 | 1.59 | 1 | 300 |
| 1.66 | 6 | 331 | 1.46 | 3 | 206 |
| 1.55 | 6 | — | Hexagonal a = 5.272(1) Å | | |
| 1.47 | 9 | 422 | c = 11.431(1) Å | | |
| Cubic a = 7.221(1) Å | | | | | |

XAMs can also generally be characterised by a specific surface of less than 45 m$^2$g$^{-1}$. Preferably the specific surface is at least 0.1 m$^2$g$^{-1}$, more preferably at least 1 m$^2$g$^{-1}$, most preferably at least 5 m$^2$g$^{-1}$. Specific surfaces of 45 m$^2$g$^{-1}$ or more are very unlikely to be achieved using solid state reaction processes unless very high specific surface reagents are used. Kaolin group minerals are the most preferred aluminosilicate reagents and do not have sufficiently high specific surfaces to produce XAMs by a solid state reaction process with specific surfaces of 45 m$^2$g$^{-1}$ or more.

M-XAM can be further characterised by its composition when it is dehydrated, that is, when it is free of adsorbed water. Its composition range is given by $$M_p Al_q Si_{1-q} O_r sH_2O \qquad 1$$

where M=alkali, $0.0 < p \leq 2.0$, $0.0 \leq q < 1.0$, $1.5 \leq r \leq 3.0$, and $0.0 \leq s \leq 0.1$. It should be noted that this general formula does not account for minor amounts of other elements being present in the XAM structure, e.g. Fe, Mg, or Ca, nor does it account for impurity minerals or compounds which are not integrated into the XAM structure, e.g. $TiO_2$-anatase, $SiO_2$-quartz.

The water identified in the empirical composition may be present as hydroxyl or bound water. Free water and adsorbed water, that is, water can be removed by heating the M-XAM at 400° C. for 16 hours, is not included in the composition. Thermogravimetric analysis of M-XAM to 1000° C. is able to determine the amount of water present as hydroxyl or bound water, and selected data are presented in Table 2.

Composition analyses and derived formulae (corresponding to formula 1) of several M-XAMs are also given below in Table 2 with cross-references to the synthesis examples described hereinafter. It is believed that unreacted reagent anions which may be used in the synthesis of XAM, for example, carbonate, bicarbonate, nitrate, are also not integrated into the XAM structures, and it is for this reason that they are not included in the empirical compositions.

Process 1

The first process involves solid state reaction of oxide-containing alkali salt and aluminium-containing phyllosilicates. The range of conditions for the successful formation of XAM by this process is dependent on the aluminium-containing phyllosilicate used.

While many oxide-containing alkali salts and all aluminium-containing phyllosilicates are suitable as starting materials for this process, we exemplify the process using alkali carbonate and kaolin group minerals, which are among the preferred starting materials.

In this first process the mole ratio of alkali carbonate ($M_2CO_3$) to the kaolin group mineral ($Al_2Si_2O_5)OH)_4$) is preferably from 0.05 to 2, and most preferably is in the range of 0.5 to 1.

Reaction is suitable carried out at an elevation temperature at atmospheric pressure for a sufficient period of time to enable conversion to XAM. Initially, the kaolin group mineral and alkali carbonate are intimately mixed then heated to

TABLE 2

Composition of XAMS*

| XAM | Weight % as oxide | | | | | | | | implied formula | | | |
|---|---|---|---|---|---|---|---|---|---|---|---|---|
| | $Na_2O$ | MgO | $Al_2O_3$ | $SiO_2$ | $K_2O$ | CaO | $TiO_2$ | $Fe_2O_3$ | p | q | r | s |
| K-XAM Example 1 | 0.7 | — | 29.6 | 38.2 | 29.3 | — | 1.5 | 1.8 | 0.53 | 0.48 | 2.025 | |
| K-XAM Example 2 | 1.3 | — | 29.2 | 37.2 | 30.1 | — | 1.6 | 1.6 | 0.57 | 0.48 | 2.045 | 0.06 |
| Na-XAM Example 3 | 19.9 | 0.2 | 29.1 | 45.8 | 0.2 | — | 1.8 | 3.0 | 0.49 | 0.43 | 2.027 | |
| Na-XAM Example 4 | 21.1 | 0.1 | 28.6 | 49.2 | 0.2 | 0.2 | 1.5 | 2.2 | 0.51 | 0.42 | 2.045 | 0.05 |
| K/Na-XAM Example 7 | 11.8 | — | 29.5 | 39.1 | 16.5 | 0.5 | 2.0 | 0.6 | Q.59 | 0.47 | 2.06 | 0.04 |
| K-XAM Example 8 | 0.5 | — | 29.8 | 37.2 | 30.6 | — | 1.4 | 2.0 | 0.55 | 0.49 | 2.03 | |
| Na-XAM Example 9 | 14.3 | — | 34.1 | 46.8 | 0.7 | 0.1 | 2.0 | 2.1 | 0.33 | 0.46 | 1.93 | |
| K-XAM Ex.12 0.66 g | 0.9 | — | 30.9 | 38.5 | 27.8 | — | 1.5 | 1.9 | 0.50 | 0.49 | 2.004 | |
| K-XAM Ex.12 0.49 g | 0.9 | — | 32.3 | 39.6 | 24.1 | — | 2.1 | 1.8 | 0.42 | 0.49 | 1.965 | |
| K-XAM Ex.12 0.33 g | 1.1 | — | 35.2 | 44.3 | 17.2 | — | 1.6 | 1.9 | 0.28 | 0.48 | 1.906 | |
| Na-XAM Ex.13 0.42 g | 16.4 | 0.1 | 31.4 | 47.8 | 0.2 | 0.3 | 1.8 | 1.9 | 0.38 | 0.44 | 1.971 | |
| Na-XAM Ex.14 131 g | 24.1 | — | 27.2 | 45:5 | 0.1 | 0.8 | 1.9 | 0.7 | 9.60 | 0.41 | 2.095 | 0.04 |
| Na-XAM Ex.14 43.7 g | 16.0 | — | 33.6 | 46.2 | 0.1 | 0.3 | 2.2 | 1.7 | 0.36 | 0.46 | 1.95 | 0.04 |
| Na-XAM Ex.20 | 18.3 | — | 28.4 | 52.8 | 0.1 | 0.1 | 0.5 | — | 0.41 | 0.39 | 2.012 | |
| K-XAM Ex.15 nitrate | 1.1 | — | 32.6 | 41.2 | 22.8 | — | 1.7 | 1.8 | 0.39 | 0.48 | 1.955 | |
| K-XAM Ex.15 acetate | 0.9 | — | 30.1 | 37.4 | 29.4 | — | 2.1 | 1.4 | 0.54 | 0.49 | 2.025 | |
| Na-XAM Ex.16 nitrate | 18.1 | — | 29.2 | 48.9 | 0.2 | 0.4 | 2.1 | 1.6 | 0.43 | 0.41 | 1.795 | |
| Na-XAM Ex.16 citrate | 22.5 | 0.2 | 26.9 | 46.0 | 0.3 | 0.2 | 1.9 | 2.0 | 0.57 | 0.41 | 2.008 | |
| K-XAM Example 19 | 1.2 | — | 28.4 | 28.7 | 43.4 | — | — | — | 0.93 | 0.54 | 2.195 | |
| Na-XAM Example 19 | 25.5 | — | 36.3 | 38.3 | — | — | — | 0.2 | 0.61 | 0.53 | 2.040 | |
| Na-XAM Ex.21 2.0:1 | 10.8 | — | 59.3 | 30.2 | 0.2 | — | 0.1 | — | 0.21 | 0.70 | 1.755 | |
| Na-XAM Ex.21 0.2:1 | 11.1 | — | 12.9 | 75.8 | — | 0.1 | — | 0.1 | 0.24 | 0.17 | 2.035 | |
| K-XAM Example 17 | 1.15 | 2.6 | 11.7 | 58.6 | 24.2 | 0.9 | 0.4 | 0.5 | 0.46 | 0.19 | 2.135 | |
| Na-XAM Example 17 | 12.6 | 3.6 | 9.9 | 70.2 | 0.3 | 2.2 | — | 1.5 | 0.30 | 0.14 | 2.08 | |
| K-XAM Example 18 | 1.2 | — | 14.2 | 63.8 | 20.0 | — | 0.6 | 1.1 | 0.35 | 0.21 | 2.07 | |
| Na-XAM Example 18 | 11.4 | 0.2 | 8.8 | 77.6 | 1.0 | 0.1 | 0.2 | 0.8 | 0.27 | 0.12 | 2.08 | |

| XAM | $Li_2O^\dagger$ | $Na_2O$ | $Al_2O_3$ | $SiO_2$ | $TiO_2$ | $Fe_2O_3$ | $Rb_2O$ | $Cs_2O$ | $p^{554}$ | q | r | s |
|---|---|---|---|---|---|---|---|---|---|---|---|---|
| Li-XAM Example 5 | 10.6 | 1.9 | 36.2 | 47.3 | 2.1 | 1.9 | — | — | 0.47 | 0.47 | 2.00 | |
| Li-XAM Example 6 | 10.9 | 1.3 | 37.3 | 46.6 | 2.1 | 1.7 | — | — | 0.49 | 0.49 | 2.00 | 0.02 |
| Rb-XAM Example 10 | — | — | 22.8 | 28.5 | 1.4 | 1.3 | 46.0 | — | 0.50 | 0.46 | 2.02 | |
| Cs-XAM Example 11 | — | 1.4 | 15.9 | 21.8 | 1.7 | 1.5 | — | 56.3 | 0.60 | 0.46 | 2.07 | |

*Determined using quantitative X-ray spectroscopy (EDS). Values not given indicate amount below detection limit.
†Lithium contents assumed as charge balancing with aluminium in the eucryptite-related structure Synthesis of XAM XAMs are prepared by a process in which an aluminosilicate, or a combination of aluminium oxide-containing and silicon oxide-containing compounds, are reacted together with an alkali oxide-containing reagent. Preferably the reaction is a solid state reaction, and three such reaction processes for the synthesis of XAM are described generally below. However, aqueous reactions may also produce acceptable XAMs.

between 300 and 750° C. until all the kaolin group mineral has reacted. The preferred conditions for this process are 450 to 550° C. for a period of between 3 and 24 hours. The resultant solid contains XAM which is usually free reaction byproducts, but may contain some unreacted $M_2CO_3$ which can be removed by rinsing with cold water.

Process 2

The second process involves solid state reaction of alkali hydroxide and aluminium-containing phyllosilicates. The range of conditions for the successful formation of XAM by this process is dependent on the aluminium-containing phyllosilicate used. We exemplify the second process using kaolin group minerals, which are among the preferred starting materials.

In this second process the mole ratio of alkali hydroxide (MOH) to the kaolin group mineral ($Al_2Si_2O_5(OH)_4$) is preferably from 0.4 to 4, and most preferably is in the range of 1.0 to 2.0.

Reaction is suitably carried out at an elevated temperature at atmospheric pressure for a sufficient period of time to enable conversion to XAM. Initially, the kaolin group mineral and alkali hydroxide are intimately mixed then heated to between 400° C. and 750° C. until all the kaolin group mineral has reacted. The preferred conditions for this process are 500° C. to 550° C. for a period of between 3 and 24 hours. The resultant solid contains XAM which is usually free of reaction byproducts, but may contain some unreacted MOH which can be removed by rinsing with cold water.

Process 3

The third process involves solid state reaction of reactive forms of silica and alumina with alkali oxide-containing reagent. We exemplify the third process using colloidal silica, aluminium nitrate nonahydrate and alkali carbonate ($M_2CO_3$: M=alkali).

In this third process, the mole ratios of colloidal silica ($-SiO_2$) to aluminium nitrate nonahydrate ($Al(NO_3)_3).9H_2$) to alkali carbonate ($M_2CO_3$) are typically 2:2:1, but can vary substantially from this within the composition range described earlier for XAM. It is possible to replace the colloidal silica by other forms of silica, such as soluble alkali silicate.

Reaction takes place by dissolving the aluminium nonahydrate and alkali carbonate in a small amount of water then adding the colloidal silica to the dissolved salts. The reaction mixture is homogenised then the water evaporated slowly, giving a gel. This gel is then further reacted at elevated temperature and atmospheric pressure for a sufficient period of time to enable conversion to XAM. The gel is heated to between 300° C. and 750° C. until XAM is observable by XRD. The preferred conditions for this process are 550° C. to 650° C. for a period of between 2 days and 6 hours. The resultant solid contains XAM which is free of starting materials and is usually free of reaction byproducts.

Examples of specific conditions of synthesis

Examples of the specific conditions of synthesis under which the components react together to give XAM are given below.

Figure 5:
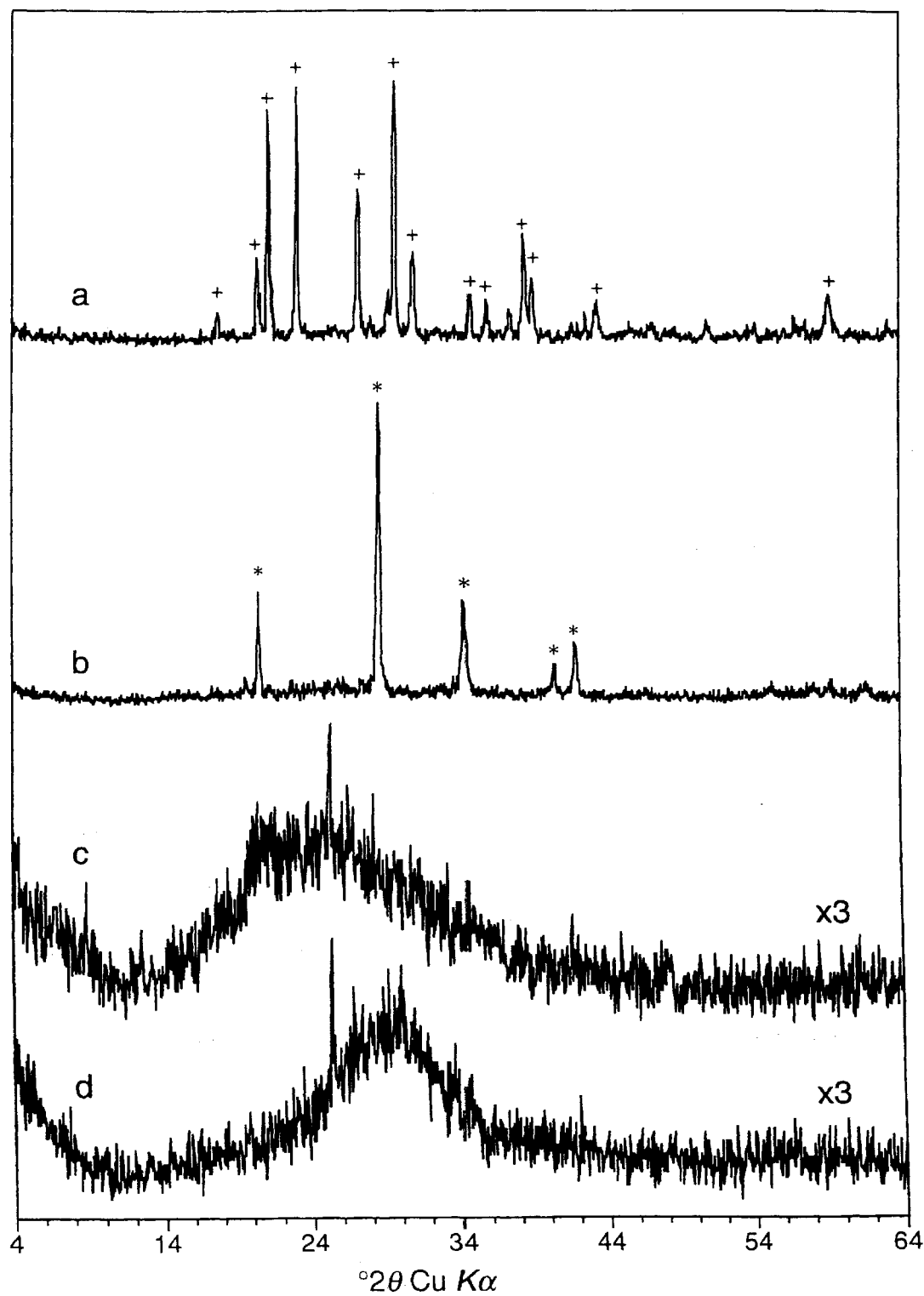
FIG. 5 shows XRD profiles of K-XAM (d) and Na-XAM (c) prepared according to Examples 1 and 3, respectively. The XRD profiles of the same K-XAM (b) and Na-XAM (a) heated at 1000° C. for 16 hours showing well crystallised kalsilite (peaks indicated by *) and nepheline (peaks indicated by +) are juxtaposed. Nepheline is the thermodynamically stable form of $NaAlSiO_4$ under these conditions.

1. A mixture containing 2.6 g of kaolinite from Weipa, Australia, and 1.6 g $K_2CO_3$ was dispersed in a small amount of distilled water to give a thick slurry. The slurry was dried at −50° C., then heated at 500° C. in a platinum vessel for 16 hours. The reaction products were then thoroughly rinsed with distilled water to remove excess $K_2CO_3$, then dried at 100° C. The dried reaction products weighed 2.7 g and comprised single phase K-XAM. The XRD profile for this material as prepared is shown in FIG. 5.

Figure 6:
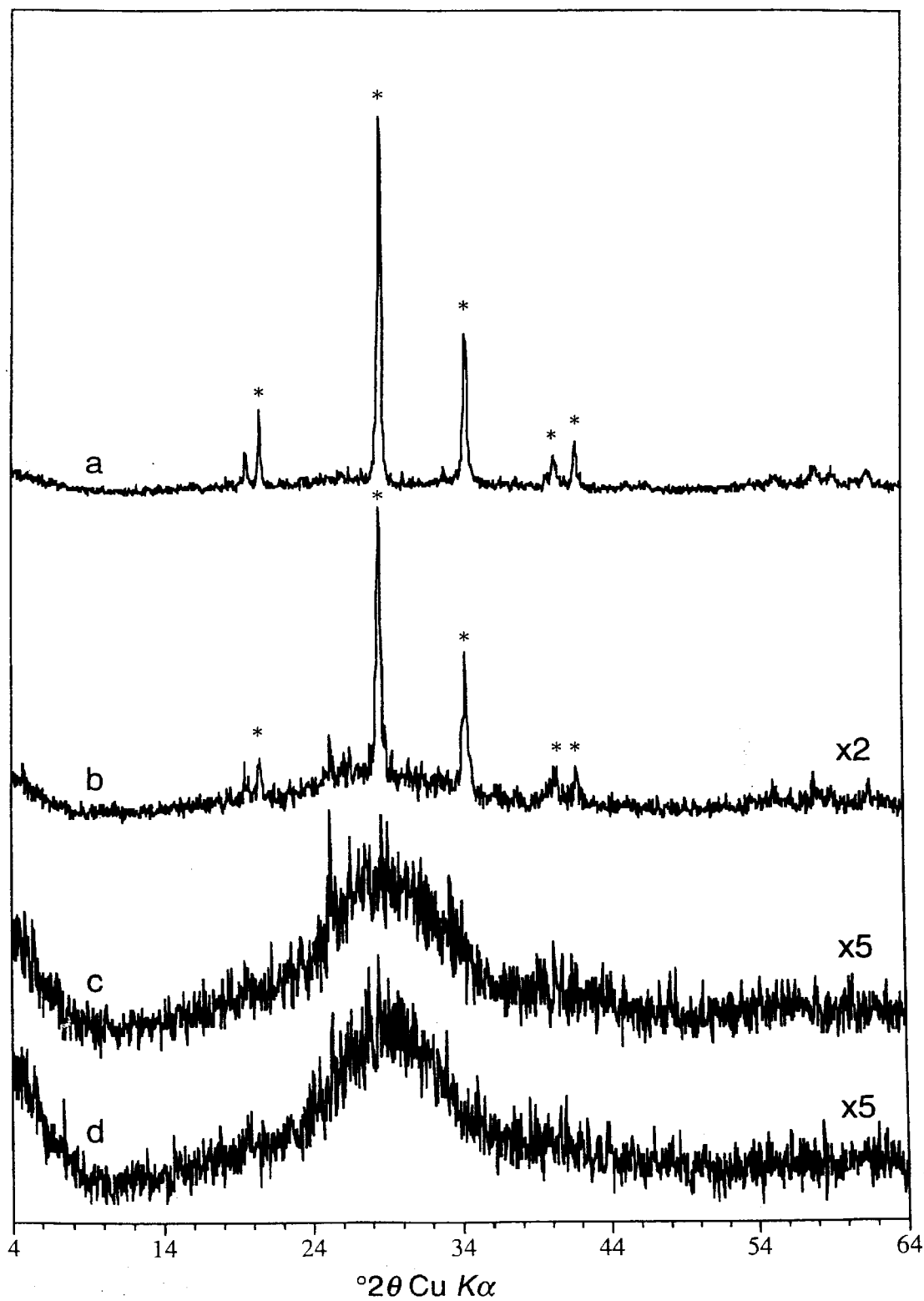
FIG. 6 shows XRD profiles of K-XAM (d) prepared according to Example 2. The XRD profiles of the same K-XAM heated at 850° C. (c), 900° C. (b), and 1000° C. (a) for 16 hours are juxtaposed. The series shows progressive increase in crystallinity with temperature, particularly the evolution of the broad peak at –29° 2θ into the strong sharp 102 reflection of well-crystallised kalsilite. Peaks belonging to well crystallised kalsilite are indicated by *.

2. 2 kg of kaolinite from Skardon River, Australia, was dispersed in 4.7 liters of water. A solution containing 0.92 kg of commercial grade $K_2CO_3$ in 3.5 liters of water was slowly added, and the resultant slurry was stirred vigorously for 20 minutes. This slurry was dehydrated using a spray drier with an inlet temperature of 250° C. The spray dried reaction mixture was heated at 500° C. for 3.5 hours. Excess $K_2CO_3$ was removed by repeated rinsing with water until the pH of the elute dropped to −9. The BET surface area of this material was 7.86 $m^2g^{-1}$. The XRD profile of this material as prepared is shown in FIG. 6.

3. A mixture containing 10.24 g of kaolinite from Weipa, Australia, and 4.24 g of $Na_2CO_3$ was dispersed with 10 ml of distilled water to give a slurry. The slurry was partially dried at −50° C., then heated at 600° C. in an alumina vessel for 16 hours. The resultant dry reaction product was remixed with water, again partly dried, then heated at 600° C. for 7 hours. The reaction product was thoroughly rinsed with distilled water to remove excess $Na_2CO_3$, then dried at 100° C. The dried reaction products weighed 9.0 g and comprised single phase Na-XAM. The XRD profile for this material is shown in FIG. 5.

Figure 7:
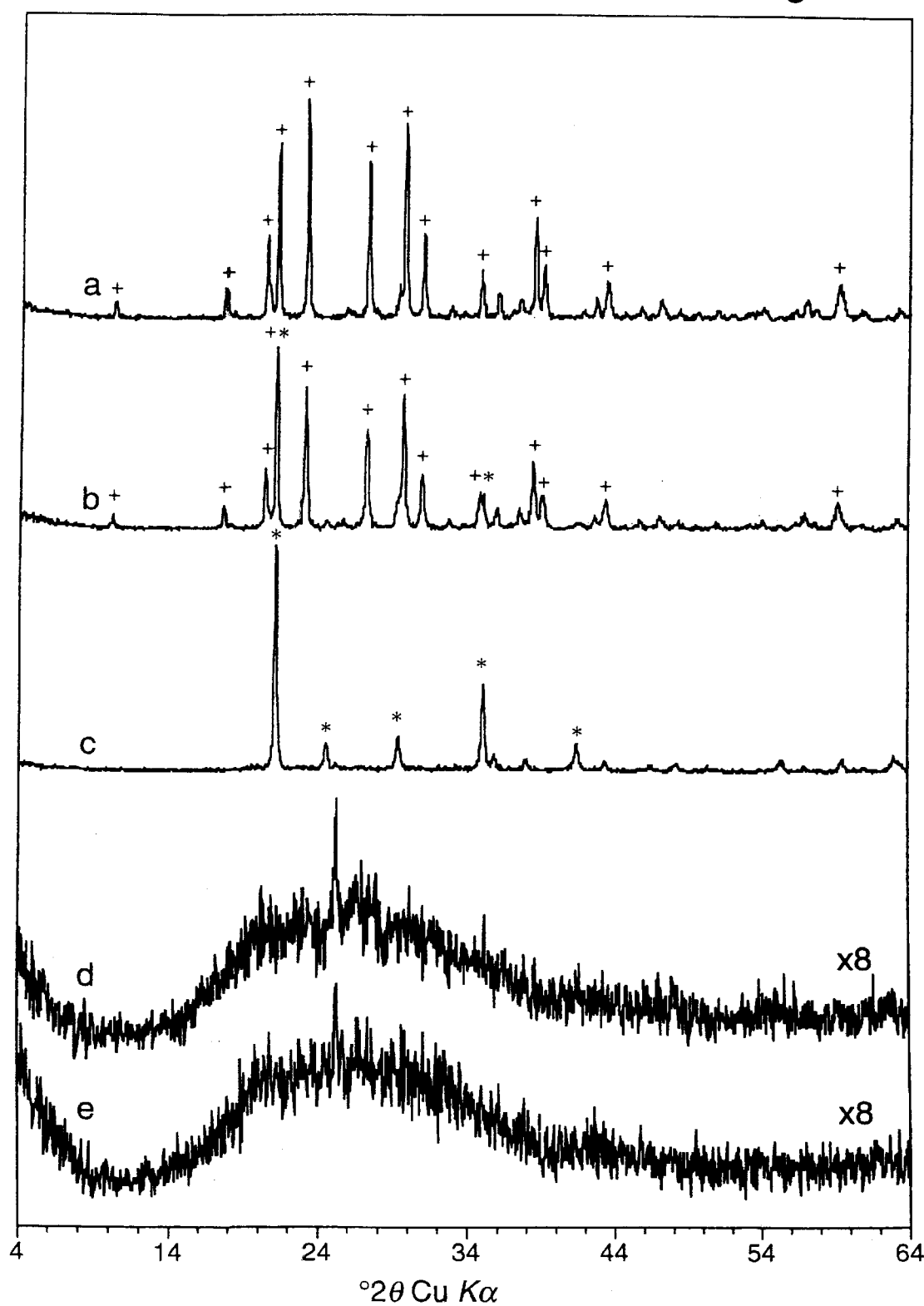
FIG. 7 shows XRD profiles of Na-XAM (e) prepared according to Example 4. The XRD profiles of the same Na-XAM heated at 665° C. (d), 800° C. (c), 900° C. (b), and 1000° C. (a) for 16 hours are juxtaposed. The series shows the increase in crystallinity with temperature, particularly the evolution of the broad composite peak between –18° and –34° 2θ into the strong sharp 111 and 220 reflections of well-crystallised high-carnegieite, followed by transformation into well-crystallised nepheline. Peaks belonging to well-crystallised carnegieite and nepheline are indicated by * and + respectively.

4. 1 kg of kaolinite from Skardon River, Australia, was dispersed in 2.33 liters of water. A solution containing 0.365 kg of commercial grade $Na_2CO_3$ in 1 liter of water was slowly added and the resultant slurry was stirred vigorously for 20 minutes. This slurry was dehydrated using a spray drier with an inlet temperature of 250° C. The spray dried reaction mixture was heated at 500° C. for 3.5 hours. Excess $Na_2CO_3$ was removed by repeated rinsing with water until the pH of the elute dropped to −9. The BET surface area of this material was 24.50 $m^2g^{-1}$. The XRD profile of this material as prepared is shown in FIG. 7.

Figure 8:
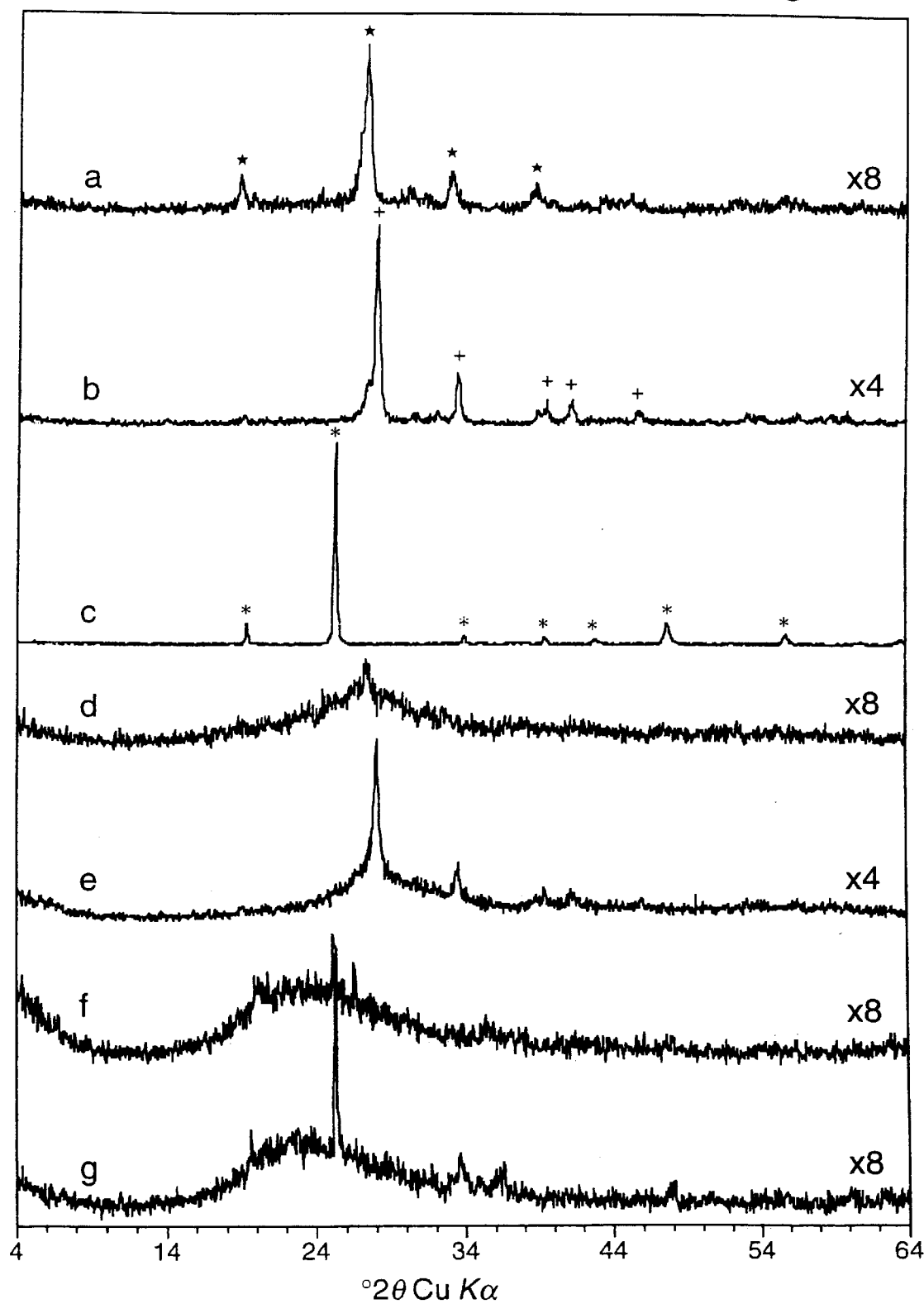
FIG. 8 shows XRD profiles of Li-XAM prepared according to Example 5 (g) and Example 6 (f), Rb-XAM prepared according to Example 10 (e) and Cs-XAM prepared according to Example 11 (d). The XRD profiles of the same Li-XAM (Example 6) (c), Rb-XAM (b) and Cs-XAM (a) heated at 1000° C. for 16 hours are juxtaposed.

5. A mixture containing 2.5 g of kaolinite from Skardon River, Australia, and 0.7 g of AR grade $Li_2CO_3$ was dispersed in a small amount of distilled water to give a thick slurry. The slurry was dried at 100° C., then heated at 460° C. in an alumina vessel for 16 hours. The reaction product was remixed with water to give a thick slurry, dehydrated at 100° C. then heated again at 460° C. for 3.5 hours. These reaction products were thoroughly rinsed with distilled water to remove excess $Li_2CO_3$, then dried at 100° C. The dried reaction products weighed 2.0 g and comprised single phase Li-XAM. The XRD profile for this material as prepared is shown in FIG. 8.

6. 200 g of kaolinite from Skardon River, Australia, was dispersed in 470 ml of water. A solution containing 134 g of AR grade lithium acetate dihydrate in 350 ml of water was slowly added and the resultant slurry was stirred vigorously for 30 minutes. This slurry was dehydrated using a spray drier with an inlet temperature of 250° C. The spray dried reaction mixture was heated at 500° C. for 16 hours. Excess lithium acetate was removed by repeated rinsing with water until the pH of the elute dropped to −9. The XRD profile of this material as prepared is shown in FIG. 8.

Figure 9:
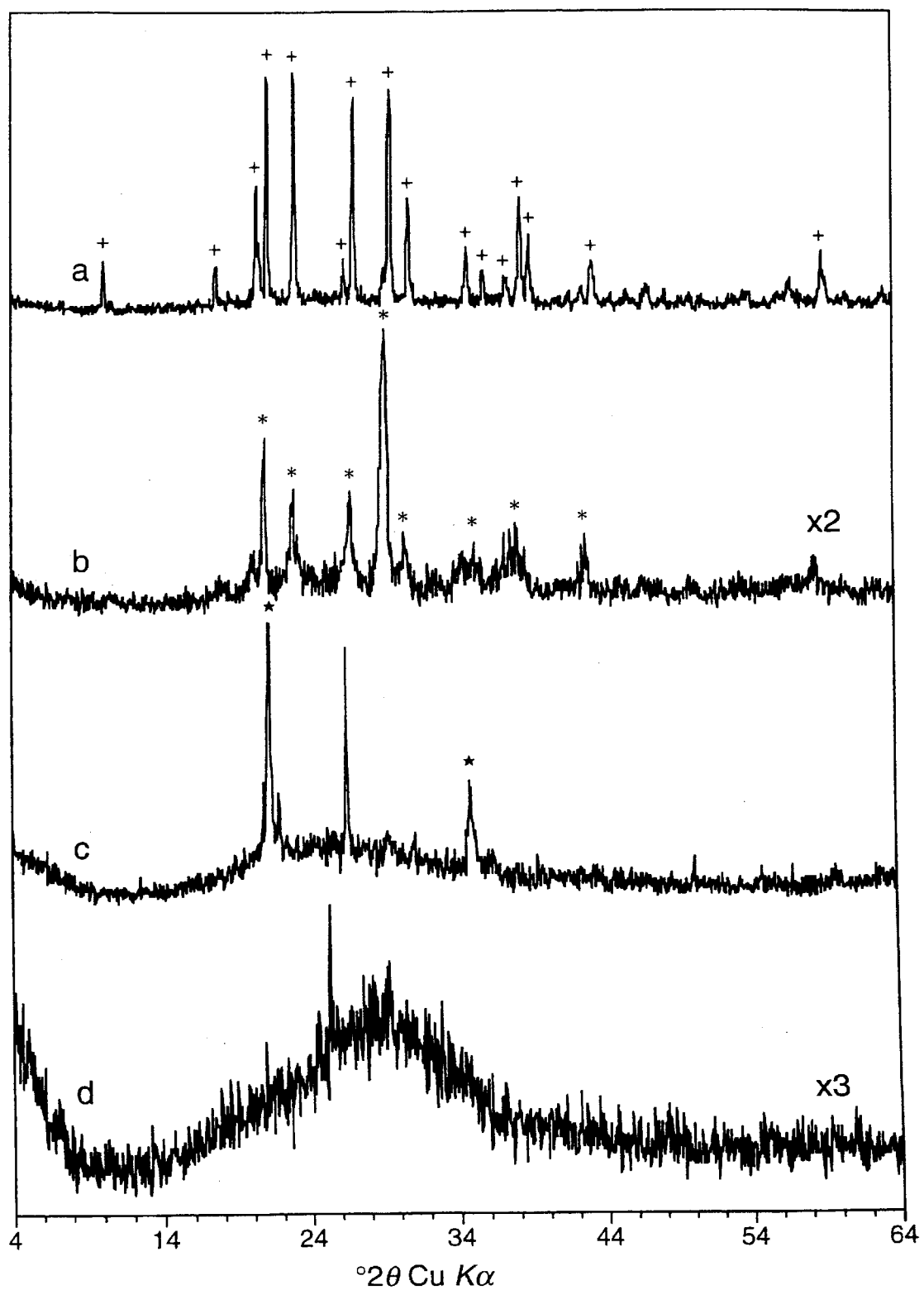
FIG. 9 shows XRD profiles of mixed K/Na-XAM (d) and Na-XAM (c) prepared according to Examples 7 and 20, respectively. The XRD profiles of the same K/Na-XAM (b) and Na-XAM (a) heated at 1000° C. for 16 hours showing well crystallised kalsilite-type (peaks indicated by *) and nepheline (peaks indicated by +) are juxtaposed; peaks indicated by ★ belong to partly crystalline carnegieite.

7. 200 g of kaolinite from Skardon River, Australia, was dispersed in 472 ml of water. A solution containing 36.5 g of commercial grade $Na_2CO_3$ and 46 g of commercial grade $K_2CO_3$ in 350 ml of water was slowly added and the resultant slurry was stirred vigorously for 20 minutes. This slurry was dehydrated using a spray drier with an inlet temperature of 250° C. The spray dried reaction mixture was heated at 500° C. for 3 hours. Excess $Na_2CO_3$ and $K_2CO_3$ were removed by repeated rinsing with water until the pH of the elute dropped to −9. The XRD profile of this material as prepared is shown in FIG. 9.

8. 1.28 g of kaolinite from Weipa, Australia, was thoroughly dry mixed with 0.5 g of finely powdered KOH. The mixture was heated in a platinum vessel at 500° C. for 16 hours. The reaction products were thoroughly rinsed with distilled water to remove excess KOH, then dried at 100° C.

Figure 11:
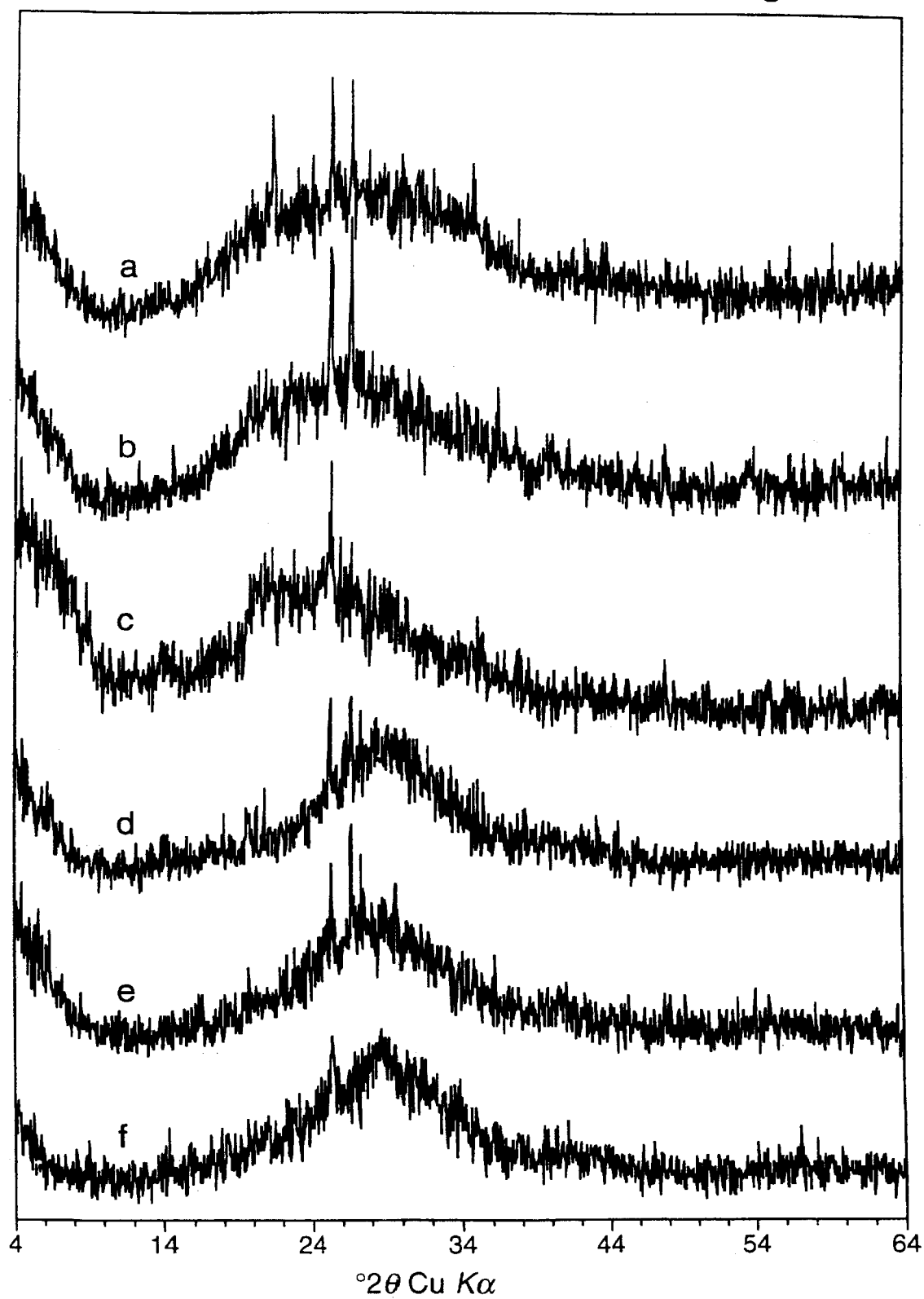
FIG. 11 shows XRD profiles of K-XAMs prepared according to Example 8 (f), Example 15 potassium nitrate (e) and potassium acetate (d), and of Na-XAMs prepared according to Example 9 (c), Example 16 sodium nitrate (b) and sodium citrate (a)

The dried reaction products weighed 1.20 g and comprised single phase K-XAM. The XRD profile for this material as prepared is shown in FIG. 11.

9. 1.28 g of kaolinite from Weipa, Australia, was thoroughly dry mixed with 0.4 g of finely powdered NaOH. The mixture was heated in a platinum vessel at 500° C. for 16 hours. The reaction products were thoroughly rinsed with distilled water to remove excess NaOH, then dried at 100° C. The dried reaction products weighted 1.1 g and comprised single phase Na-XAM. The XRD profile for this material as prepared is shown in FIG. 11.

10. A mixture containing 2.5 g of kaolinite from Skardon River, Australia, and 2.3 g of AR grade $Rb_2CO_3$ was dispersed in a small amount of distilled water to given a thick slurry. The slurry was dried at 100° C. then heated at 460° C. in an alumina vessel for 16 hours. The reaction products were thoroughly rinsed with distilled water to remove excess $Rb_2CO_3$, then dried at 100° C. The dried reaction products weighed 3.15 g and comprised single phase Rb-XAM. The XRD profile for this material as prepared is shown in FIG. 8.

11. A mixture containing 2.5 g of kaolinite from Skardon River, Australia, and 3.5 g of AR grade $Cs_2CO_3$ was dispersed in a small amount of distilled water to give a thick slurry. The slurry was dried at 100° C., then heated at 460° C. in an alumina vessel for 16 hours. The reaction products were thoroughly rinsed with distilled water to remove excess $Cs_2CO_3$, then dried at 100° C. The dried reaction products weighed 4.18 g and comprised single phase Cs-XAM. The XRD profile for this material as prepared is shown in FIG. 8.

Figure 10:
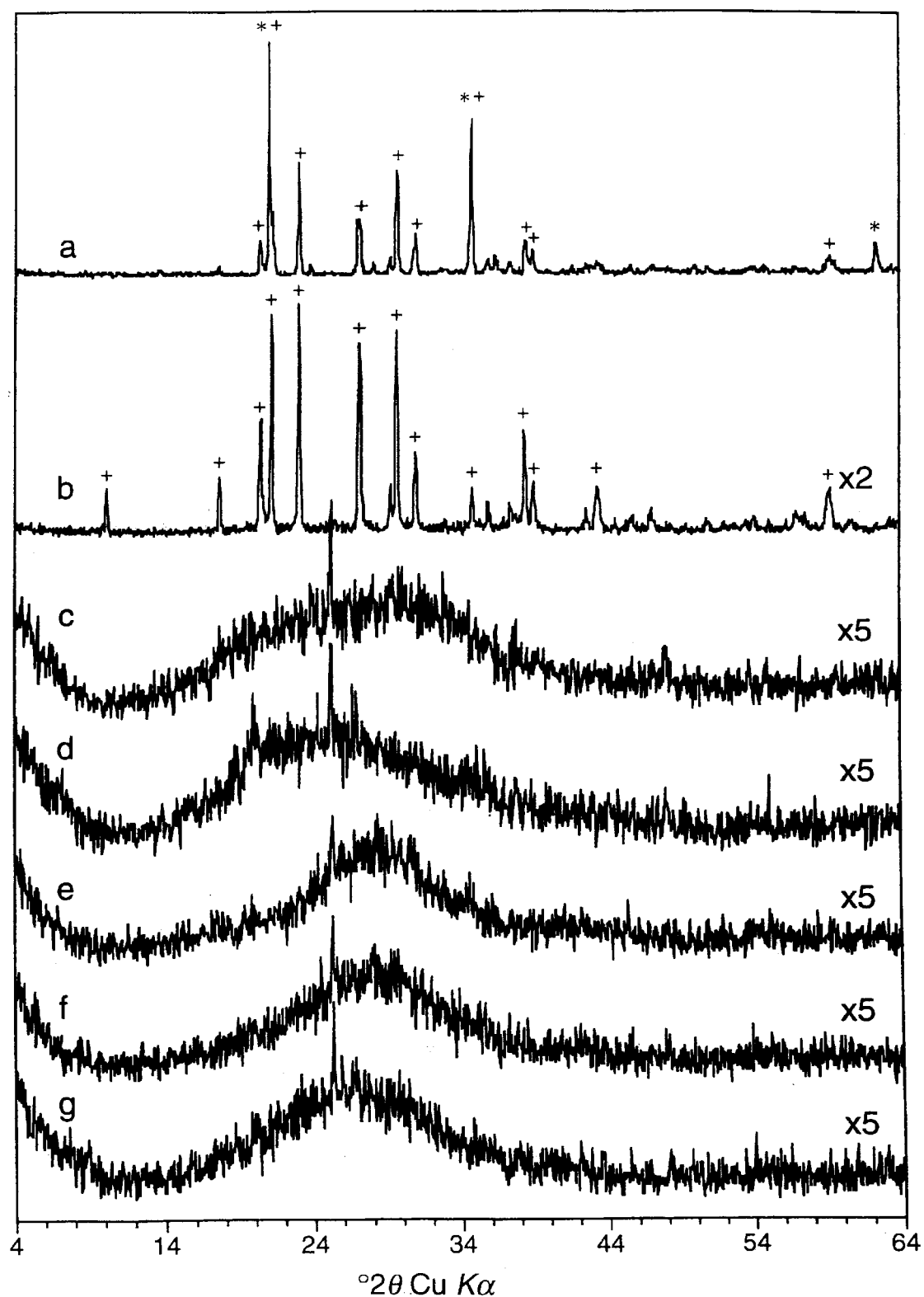
FIG. 10 shows XRD profiles of the series of K-XAMs prepared according to Example 12, 0.33 g $K_2CO_3$ (g), 0.49 g $K_2CO_3$ (f), 0.66 g $K_2CO_3$ (e), and of Na-XAMs prepared according to Example 14, 43.7 g $Na_2CO_3$ (d), and 131 g $Na_2CO_3$ (c). The XRD profiles of the same Na-XAMs heated at 1000° C. for 16 hours showing well-crystallised nepheline and carnegieite (peaks indicated by * and +, respectively) are given as 10b (43.7 g) and 10a (131 g)

12. Four separate mixtures containing 1.28 g of kaolinite from Skardon River, Australia, and 0.85, 0.66, 0.49 and 0.33 g, respectively, of $K_2CO_3$ were each dispersed in a small amount of distilled water to give a thick slurry. The slurries were dried at −50° C., then heated at 500° C. in alumina vessels for 16 hours. The reaction products were thoroughly rinsed with distilled water to remove excess $K_2CO_3$ then dried at 100° C. The dried reaction products weighed 1.59, 1.32, 1.13 and 1.2 g, respectively, and comprised single phase K-XAM. The XRD profiles for three of these as-prepared materials are shown in FIG. 10.

13. Two separate mixtures containing 5.12 g of kaolinite from Skardon River, Australia, and 2.12 g of commercial grade $Na_2CO_3$, and 1.28 g of the same kaolinite and 0.42 g of $Na_2CO_3$, were each dispensed in a small amount of distilled water to give a thick slurry. The slurries were dried at 100° C., then heated at 600° C. in alumina vessels for 16 hours. The reaction products were then thoroughly rinsed with distilled water to remove excess $Na_2CO_3$ then dried at 100° C.

14. Two separate spray dried reaction mixtures were prepared at different mole ratios. Two aliquots of 200 g of kaolinite from Skardon River, Australia, were each dispersed in 492 ml of water. Solutions containing 43.7 g of commercial grade $Na_2CO_3$ in 125 ml of water and 131 g of commercial grade $Na_2CO_3$ in 500 ml of hot water were slowly added and the resultant slurries were stirred vigorously for 20 minutes. These slurries were dehydrated using a spray drier with an inlet temperature of 250° C. The spray dried reaction mixture was heated at 500° C. for 3.5 hours. Excess $Na_2CO_3$ was removed in each case by repeated rinsing with water until the pH of the elute dropped to −9. The XRD profiles of the respective materials as prepared are shown in FIG. 10.

15. Two separate mixtures containing 1.28 g of kaolinite from Skardon River, Australia, and 1.0 g of $KNO_3$, and 1.0 g of potassium acetate were dispersed in a small amounts of distilled water to give thick slurries. The slurries were dried at 100° C., then heated at 450° C. in alumina vessesl for 16 hours. The reaction products were thoroughly rinsed with distilled water to remove excess potassium salt then dried at 100° C. The dried reaction products each weighed 1.3 g. The nitrate and acetate products comprise single phase K-XAM. The XRD profiles for these materials are shown in FIG. 11.

16. Two separate mixtures containing 2.56 g of kaolinite from Skardon River, Australia, and 1.7 g of $NaNO_3$ and 2.0 g of sodium citrate were dispersed in a small amount of distilled water to give thick slurries. The slurries were dried at 100° C., then heated at 450° C. in alumina vessesl for 16 hours. The reaction products were thoroughly rinsed with distilled water to remove excess sodium salt, then dried at 100° C. The dried reaction products weighed 2.02 and 2.2 g respectively. The nitrate and citrate products comprise single phase Na-XAM. The XRD profiles for these materials are shown in FIG. 11.

Figure 12:
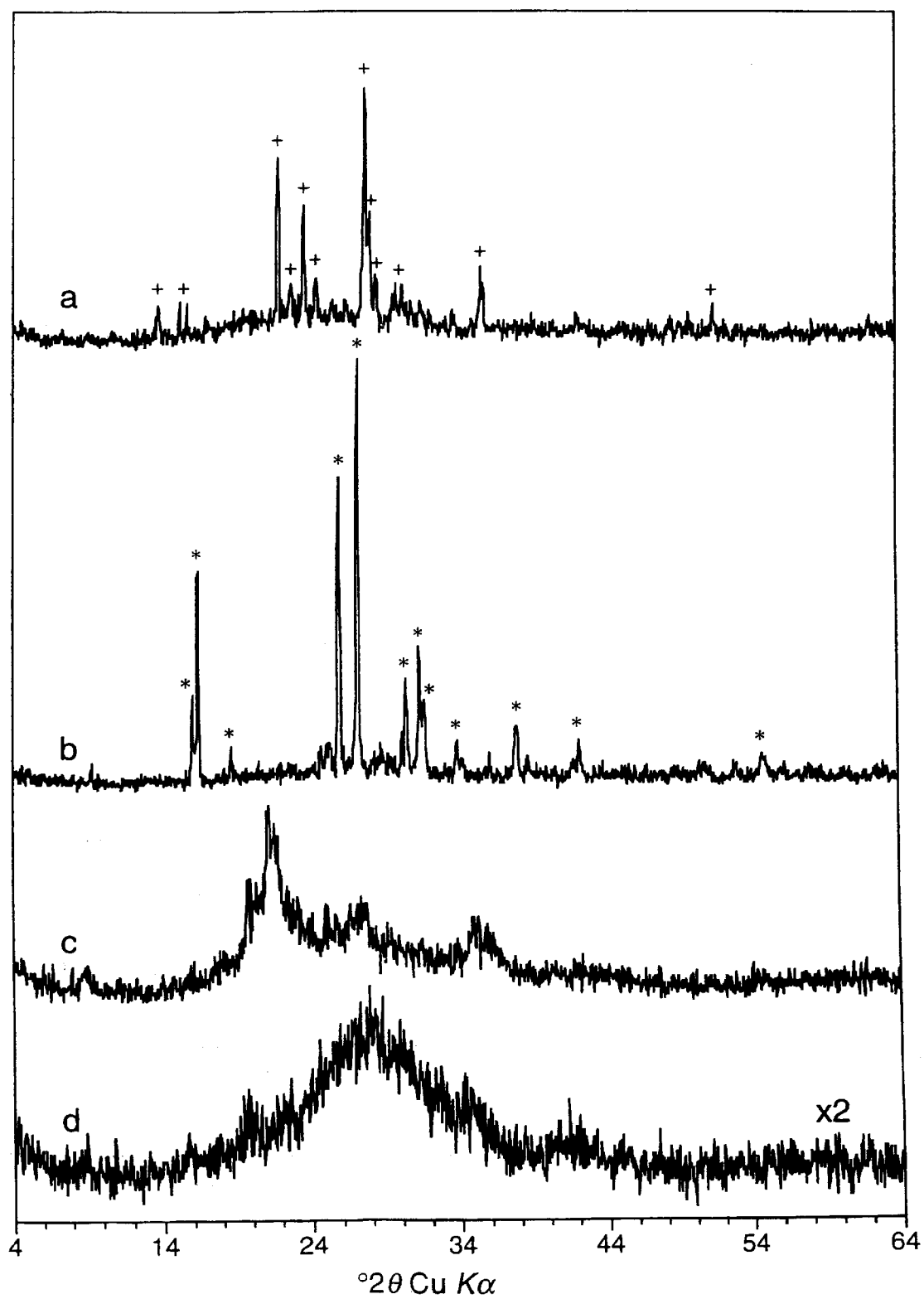
FIG. 12 shows XRD profiles of K-XAM (d) and Na-XAM (c) prepared from montmorillonite according to Example 17. The XRD profiles of the same K-XAM (b) and Na-XAM (a) heated at 1000° C. for 16 hours showing well crystallised leucite-like (peaks indicated by +) and albite-like (peaks indicated by *) phases, respectively, are juxtaposed.

17. Two separate mixtures containing 1.00 g of montmorillonite from Texas, USA, and 0.41 g of $K_2CO_3$, and 0.27 g of $Na_2CO_3$ were dispersed in a small amount of distilled water to give slurries. The slurries were partially dried at −50° C., then heated at 600° C. in an alumina vessel for 16 hours. The resultant potassium dry reaction products were remixed with water, again partly dried, then heated at 600° C. for 16 hours. Both reaction products were thoroughly rinsed with distilled water to remove excess $K_2CO_3$ and $Na_2CO_3$, then dried at 100° C. The dried reaction products weighed 0.88 and 0.75 g respectively. The XRD profiles for these materials are shown in FIG. 12.

Figure 13:
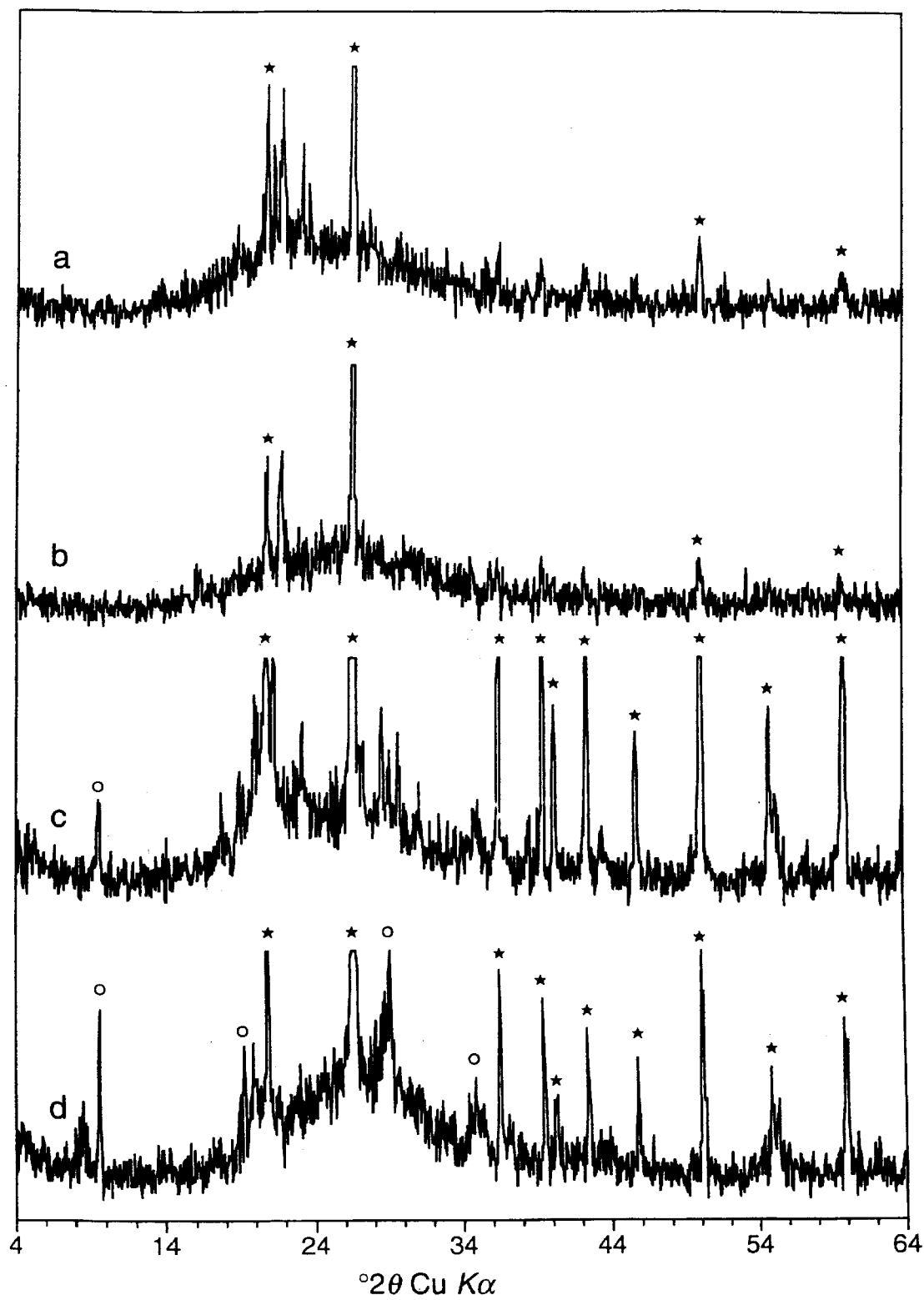
FIG. 13 shows XRD profiles of K-XAM (d) and Na-XAM (c) prepared from pyrophyllite according to Example 18. The XRD profiles of the same K-XAM (b) and Na-XAM (a) heated at 1000° C. for 16 hours showing similar broad diffraction features to the as-prepared XAMs are juxtaposed. In the as-prepared M-XAMs, diffraction peaks due to quartz impurity and unreacted pyrophyllite are indicated by ★ and ○, respectively.

18. Two separate mixtures containing 1.00 g of pyrophyllite and 0.46 g of $K_2CO_3$, and 0.30 g of $Na_2CO_3$ were dispersed in a small amount of distilled water to give slurries. The slurries were partially dried at −50° C., then heated at 600° C. in an alumina vessel for 16 hours. The resultant sodium dry reaction products were remixed with water, again partly dried, then heated at 600° C. for 16 hours. Both reaction products were thoroughly rinsed with distilled water to remove excess $K_2CO_3$ and $Na_2CO_3$, then dried at 100° C. The dried reaction products weighed 0.85, 0.67 g respectively. The XRD profiles for these materials are shown in FIG. 13.

Figure 14:
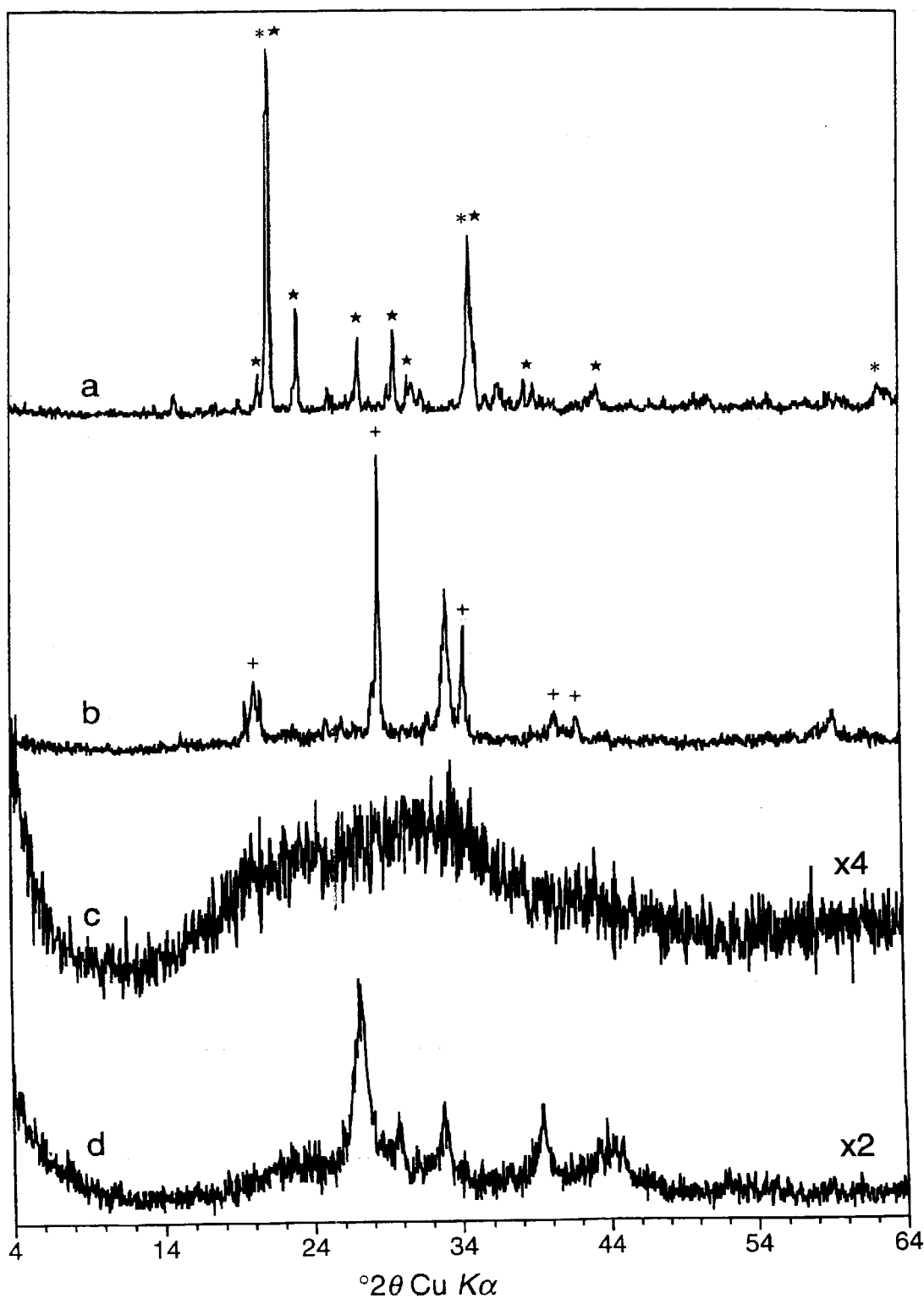
FIG. 14 shows XRD profiles of K-XAM (d) and Na-XAM (c) prepared from colloidal silica, aluminium nitrate and alkali carbonate according to Example 19. The XRD profiles of the same K-XAM (b) and Na-XAM (a) heated at 1000° C. for 16 hours showing well crystallised kalsilite-like and carnegieite-like phases, respectively, are juxtaposed. Peaks belonging to well-crystallised carnegieite, nepheline and kalsilite are indicated by *, ★, and + respectively.

19. To 5 ml of distilled water were added 3.75 g of aluminium nitrate nonahydrate and 0.53 g of anhydrous sodium carbonate or 0.825 g of potassium carbonate hydrate. 1.58 g of Ludox AM (du Pont) colloidal silica was added to this solution and stirred for 30 minutes. The resultant solution was evaporated to dryness at 100° C. in a platinum crucible, then heated at 500° C. for 16 hours. The dried reaction product was poorly crystalline single phase Na-XAM or K-XAM, depending on the carbonate used. The XRD profiles for these reaction products are shown in FIG. 14.

20. A mixture containing 2.56 g of halloysite from Mataura Bay, New Zealand, and 1.04 g of commercial grade Na$_2$CO$_3$ were dispersed in a small amount of distilled water to give a thick slurry. The slurry was dried 100° C., then heated at 460° C. in an alumina vessel for 16 hours. The reaction product was remixed with water to give a thick slurry, dehydrated at 100° C., then heated again at 460° C. for 3.5 hours. The reaction products were thoroughly rinsed with distilled water to remove excess Na$_2$CO$_3$, then dried at 100° C.

The dried reaction products weighed 1.8 g and comprised single phase Na-XAM. The XRD profile for this material is shown in FIG. 9.

the exchange reaction, such as temperature, time and concentration of exchange solution.

Table 3 lists the percent cation exchange for a selection of cations for a range of XAMs. Cation exchange was performed using concentrated solutions (typically >5 M) of the relevant soluble salt, except for UO$_2^{2+}$ which used a 0.33 M uranyl nitrate solution and La$^{3+}$ which used a 0.65 M solution.

TABLE 3

|  | Cu$^{2+}$ | Cd$^{2+}$ | Pb$^{2+}$ | Mg$^{2+}$ | Zn$^{2+}$ | Ca$^{2+}$ | La$^{3+}$ | UO$_2^{2+}$ | Fe$^{3+}$ | Ni$^{2+}$ | Co$^{2+}$ | NH$_4^+$ |
|---|---|---|---|---|---|---|---|---|---|---|---|---|
| Cation exchange capacity* (CEC) derived from replacement of alkali metal$^§$ in selected XAMs | | | | | | | | | | | | |
| K-XAM Example 1 | 395 | | | | | | | | | | | |
| K-XAM Example 2 | 542 | 317 | 474 | 426 | 631 | 269 | 200 | 420 | 319 | 588 | 551 | 465 |
| Na-XAM Example 3 | 492 | 176 | 352 | 528 | 492 | 176 | | 229 | | | | |
| Na-XAM Example 4 | 503 | 445 | 580 | 550 | 667 | 443 | 381 | 565 | 479 | 409 | 559 | 289 |
| Weight percent as oxide of exchange cation for a range of cations | | | | | | | | | | | | |
| K-XAM Example 2 | 48.3 | 8.7 | 28.5 | 8.0 | 39.1 | 3.5 | 10.0 | 21.9 | 4.3 | 31.0 | 33.5 | |
| Na-XAM Example 4 | 39.3 | 7.6 | 34.8 | 8.3 | 31.6 | 3.9 | 9.8 | 22.8 | 5.2 | 40.0 | 33.1 | |

*milliequivalents per 100 g determined as percent removal of alkali cation
$^§$reduction of alkali metal determined by X-ray spectroscopy (EDS)
$^†$exchange cation content determined by X-ray spectroscopy (EDS)

21. Two extreme compositions of Na-XAM were prepared as follows.

To give an Al:Si ratio of 0.2:1.0, 5 ml of distilled water were added to 1.875 g of aluminium nitrate nonahydrate and 0.265 g of anhydrous sodium carbonate. 3.9 g of Ludox AM (du Pont) colloidal silica was added to this solution and stirred for 30 minutes. The resultant solution was evaporated to dryness at 100° C. in a platinum crucible, the heated at 500° C. for 16 hours. The dried reaction product weighed 1.32 g and was single phase Na-XAM.

Figure 15:
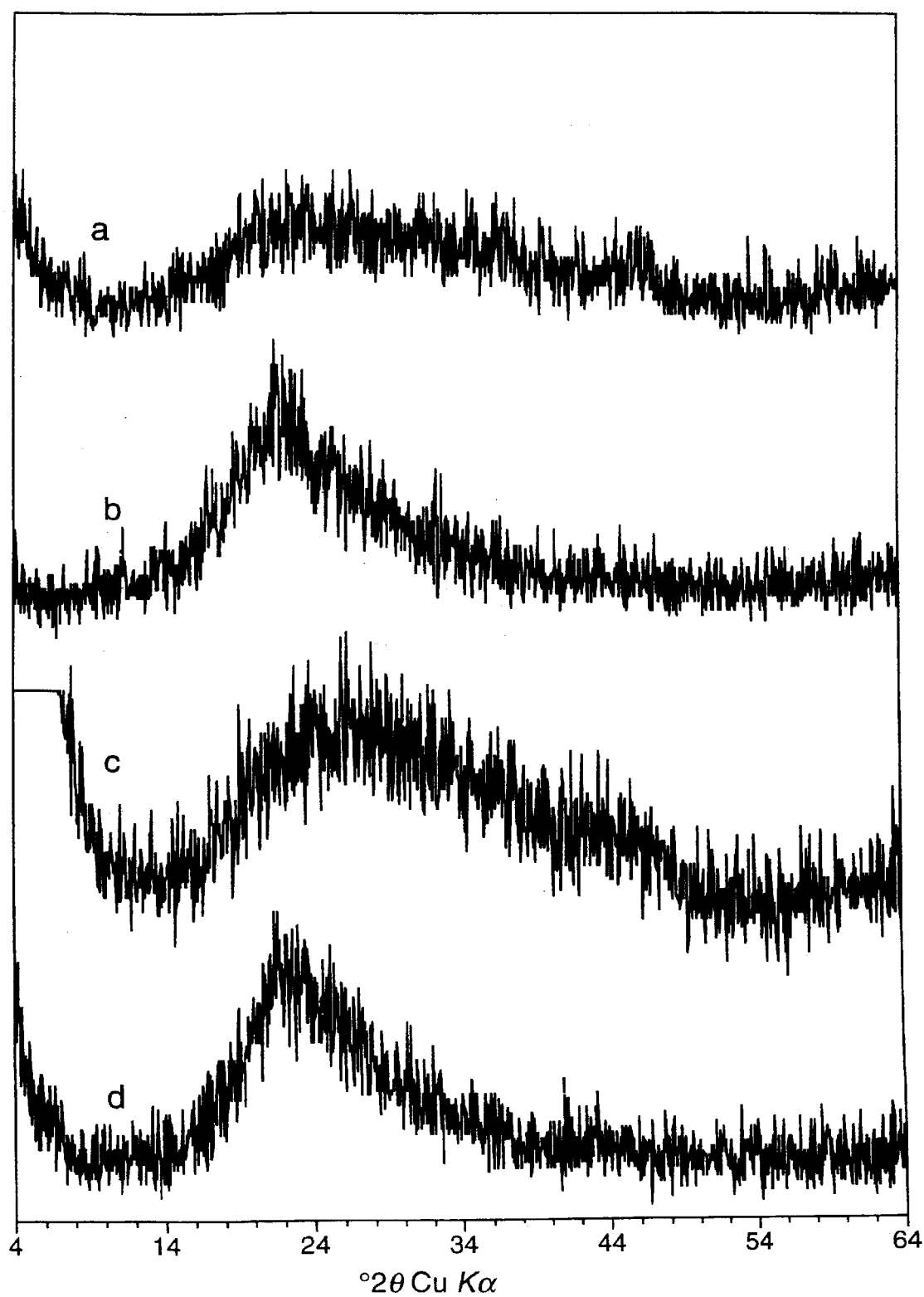

To give a Al:Si ratio of 2.0:1.0, 5 ml of distilled water were added to 3.7 g of aluminium nitrate nonahydrate and 0.53 g of anhydrous sodium carbonate. 0.8 g of Ludox AM (du Pont) colloidal silica was added to this solution and stirred for 30 minutes. The resultant solution was evaporated to dryness at 100° C. in a platinum crucible, then heated at 500° C. for 16 hours. The dried reaction product weighed 0.7 g and was single phase Na-XAM. The XRD profiles for these reaction products are shown in FIG. 15.

Properties of XAM

In XAM it is possible to exchange, at least partly, the alkali metal cation with any cation which is stable in aqueous solution. Such exchange cations include other alkali metal cations, alkaline earth cations, transition metal cations, lanthanide and actinide cations, other metal cations and ammonium. There are many transition metal cations (e.g. Co$^{2+}$, Ni$^{2+}$, Cu$^{2+}$, Fe$^{2+}$), lanthanide cations (e.g. La$^{3+}$) other metal cations (e.g. Pb$^{2+}$, Cd$^{2+}$, Zn$^{2+}$) and actinide cations (e.g. UO$_2^{2+}$) which show high levels of cation exchange for XAM prepared under certain conditions. However, the extent of exchangeability of cations depends on the method of preparation of XAM and the conditions of In aqueous suspension, XAM has a particular affinity to certain cations. The cations include the alkaline earths Mg$^{2+}$, Sr$^{2+}$ and Ca$^{2+}$, the transition metals Cu$^{2+}$, Ni$^{2+}$, Co$^{2+}$, Ag$^+$, Fe$^{2+}$, Cr$^{3+}$ and Mn$^{2+}$, the other metal cations Al$^{3+}$, Zn$^{2+}$, Cd$^{2+}$, Pb$^{2+}$ and Hg$^{2+}$, the lanthanide Nd$^{3+}$, and the actinide-containing cation UO$_2^{2+}$. It is expected that XAM will also have affinity to other aqueous cations with similar size, shape and charge to those listed above. Also, due to the similar chemical behaviour of trivalent lanthanides it is assumed that the properties demonstrated for Nd$^{3+}$ will apply to all trivalent lanthanides, including Y$^{3+}$.

The affinity of XAM for these cations has been demonstrated by measuring the percent uptake of each of these cations from a solution containing a low concentration (10–100 ppm) of the subject cation and a relatively high concentration of Na$^+$ (0.1 M). The details of selectivity experiments together with their results are given in Table 4. The level of selectivity of XAM towards these cations is relatively independent of temperature but the rate of exchange is significantly enhanced by increase in temperature.

For the purpose of this invention, to identify those cations for which M-XAM (M=alkali metal) is highly selective in aqueous solution, we arbitrarily define high selectivity as removing ≧90% of that cation from a solution containing 0.1 M Na$^+$ as background. We define M-XAM as being selective when ≧10% of that cation is removed under the same condition.

TABLE 4

Selectivity results (% removed) for a selectlon of XAMs for various cations

|  | $Cu^{2+}$ | $Cd^{2+}$ | $Pb^{2+}$ | $Mg^{2+}$ | $Zn^{2+}$ | $Ca^{2+}$ |
|---|---|---|---|---|---|---|
| pH | 6.5 | 5.0 | 4.5 | 6.5 | 6.5 | 6.5 |
| Concentration (ppm) | 100 | 10 | 20 | 10 | 10 | 20 |
| K-XAM Example 1 | 99.9 | — | — | — | — | — |
| Na-XAM Example 3 | 99.8 | 64.4 | 95.1 | 86.3 | 93.6 | 97.0 |

Unless otherwise indicated 25 ml of solution is treated with 0.09 g of XAM overnight at room temperature.
All solutions contain a background of 0.1 M $Na^+$.
All cation concentrations measured by atomic absorption spectroscopy (AAS)

|  | $Cu^{2+}$ | $Cd^{2+}$ | $Pb^{2+}$ | $Hg^{2+}$ | $Zn^{2+}$ | $Ca^{2+}$ | $Ca^{2+}$ | $Mg^{2+}$ |
|---|---|---|---|---|---|---|---|---|
| pH | 6.5 | 3.5 | 3.5 | 1.5 | 6.5 | 6.5 | 6.5 | 6.5 |
| Concentration (ppm) | 100 | 100 | 100 | 100 | 100 | 100 | 20 | 20 |
| K-XAM Example 1 | 94.3 | 81.9 | 100.0 | — | 99.6 | 28.3 | — | 51.1 |
| K-XAM Example 2 | >99.99 | 97.5 | 100.0 | 81.3 | 99.9 | 45.1 | >99.5 | 32.2 |
| Na-XAM Example 3 | 99.99 | 44.0 | 100.0 | — | 84.2 | 56.5 | — | 28.2 |
| Na-XAM Example 4 | 99.99 | 84.1 | 100.0 | 60.0 | 98.4 | 50.3 | >99.5 | 21.0 |
| Li-XAM Example 5 | 98.2 | 80.2 | 98.0 | — | 99.8 | 44.6 | — | 42.4 |
| Li-XAM Example 6 | 99.35 | 82.5 | 99.7 | — | 100.0 | 36.2 | — | 44.7 |
| Na/K-XAM Example 7 | 99.98 | 100.0 | 99.8 | — | 100.0 | 39.8 | — | 6.6 |

Unless otherwise indicated 100 ml of solution is treated with 1 g of XAM for 15 minutes at room temperature.
All solutions contain a background of 0.1 M $Na^+$ except for $Ca^{2+}$
$Cu^{2+}$ and $Ca^{2+}$ concentrations measured by ion selective electrodes, all other cation concentrations measured by atomic absorption spectroscopy (AAS)
$Cu^{2+}$ and $Pb^{2+}$ selectivity for other XAMs (percent removed)

| Example | 8 | 9 | 10 | 11 | 12 | 12 | 12 | 13 | 14 | 14 |
|---|---|---|---|---|---|---|---|---|---|---|
| XAM | K-XAM | Na-XAM | Rb-XAM | Cs-XAM | K-XAM | K-XAM | K-XAM | Na-XAM | Na-XAM | Na-XAM |
| Reagent/weight |  |  |  |  | 0.66 g | 0.49 g | 0.33 g | 0.42 g | 131 g | 43.7 g |
| $Cu^{2+}$ | 97.2 | 99.99 | 99.99 | 99.99 | 99.7 | 95.8 | 60.5 | 90.6 | 99.99 | 79.2 |
| $Pb^{2+}$ | 99.8 | 98.7 | 99.8 | 99.7 | 99.8 | 98.8 | 46.1 | 99.7 | 99.9 | 99.5 |

| Example | 15 | 15 | 16 | 16 | 17 | 17 | 18 | 18 | 19 | 19 |
|---|---|---|---|---|---|---|---|---|---|---|
| XAM | K-XAM | K-XAM | Na-XAM | Na-XAM | K-XAM | Na-XAM | K-XAM | Na-XAM | K-XAM | Na-XAM |
| Reagent/weight | nitrate | acetate | nitrate | citrate | mont. | mont. | pyroph. | pyroph. |  |  |
| $Cu^{2+}$ | 96.6 | 99.99 | 99.4 | 99.99 | 99.99 | 64.5 | 99.98 | 79.6 | 98.05 | 99.99 |
| $Pb^{2+}$ | 100.0 | 99.9 | 100.0 | 99.6 | 99.5 | 99.7 | 99.8 | 99.7 | 99.8 | 99.4 |

| Example | 20 | 21 | 21 | 2 | 2 | 4 | 4 |
|---|---|---|---|---|---|---|---|
| XAM | Na-XAM | K-XAM | Na-XAM | K-XAM | K-XAM | Na-XAM | Na-XAM |
| Reagent/weight | halloysite | 2.0:1.0 | 0.2:1.0 | 1000° C. | 1200° C. | 1000° C. | 1200° C. |
| $Cu^{2+}$ | 98.34 | 99.99 | 99.6 | 19.0 | 0.o | 10.7 | 0.0 |
| $Pb^{2+}$ | 99.9 | 99.6 | 99.1 | 21.0 | 0.0 | — | 0.0 |

For all analyses 100 ml of solution is treated with 1 g of XAM for 15 minutes at room temperature. All solutions contain a background of 0.1 M $Na^+$.
$Cu^{2+}$ concentrations measured by ion selective electrode. $Pb^{2+}$ concentrations measured by atomic absorption spectroscopy (AAS).

|  | $Ni^{2+}$ | $Co^{2+}$ | $Ag^+$ | $Fe^{2+}$ | $Cr^{3+}$ | $Mn^{2+}$ | $Sr^{2+}$ | $Al^{3+}$ | $Nd^{3+}$ | $UO_2^{2+}$ |
|---|---|---|---|---|---|---|---|---|---|---|
| pH | 5.5 | 5.5 | 4.0 | 5.0 | 4.5 | 5.5 | 6.0 | 4.5 | 4.5 | 2.5 |
| Concentration (ppm) | 100 | 100 | 100 | 100 | 100 | 100 | 100 | 100 | 5230 | 2390 |
| K-XAM Example 2 | 100.0 | 99.55 | 99.66 | 99.92 | 100.0 | 79.63 | 67.49 | 98.68 | 25 | 31 |
| Na-XAM Example 4 | 89.75 | 90.70 | 99.79 | 99.95 | 100.0 | 60.75 | 58.76 | 99.68 | 25 | 29 |
| Li-XAM Example 6 | 66.90 | 80.70 | 99.79 | 94.66 | 99.35 | 54.02 | 45.92 | 80.38 | 15 | 16 |

Unless otherwise indicated 100 ml of solution is treated with 1 g of XAM for 15 minutes at room temperature.
All solutions contain a background of 0.1 M $Na^+$.
All cation concentrations measured by atomic absorption spectroscopy (AAS) except for $Nd^{3+}$ and $UO_2^{2+}$ which are determined by UV/visible spectroscopy.

Applications of XAM

The high CEC which XAM displays and its high selectivity to a number of aqueous cations makes XAM potentially useful in the treatment of industrial and mine waste water, as well as in the remediation of contaminated environmental waters. In particular, its high selectivity to aqueous $Cu^{2+}$, $Zn^{2+}$, $Cd^{2+}$, and $Pb^{2+}$ all of which are toxic and environmentally problematic, make XAM particularly useful for such applications. It is probable the XAM will also sequester these cations from non-aqueous solvents or from liquid mixtures containing such non-aqueous solvents, such as wine.

XAM is also potentially suitable for application as a detergent builder or water softener as it shows a capability to sequester $Ca^{2+}$ and $Mg^{2+}$ from solution.

The potentially high CEC of XAM enables high loading levels of various cations. These highly exchanged XAMs may have application in the delivery of these cations in pharmaceuticals, stock feed, horticulture and agriculture.

XAMs which have been highly exchanged by transition metals or lanthanides are likely to have potential usage as heterogeneous catalysts.

Whilst the above has been given by way of illustrative example of the invention, many modifications and variations may be made thereto by persons skilled in the art without departing from the broad scope and ambit of the invention as herein set forth.

We claim:

1. A poorly or partly crystalline alkali metal aluminosilicate material having a stuffed silica polymorph related-structure in which the aluminium is at least predominantly tetrahedrally coordinated and a cation exchange capacity at room temperature of at least 1 meq 100 $g^{-1}$ in aqueous solution, which is produced by reacting an aluminosilicate, or a combination of aluminium oxide-containing and silicon oxide-containing compounds, with an alkali oxide-containing reagent.

2. A material according to claim 1 having a BET surface area of at least 0.1 $m^2g^{-1}$.

3. A material according to claim 2 having a BET surface area of at least 1 $m^2g^{-1}$.

4. A material according to claim 3 having a BET surface of at least 5 and less than 45 $m^2g^{-1}$.

5. A material according to claim 1 wherein said cation exchange capacity is at least 10 meq 100 $g^{-1}$.

6. A material according to claim 5 wherein said cation exchange capacity is in the range 50–750 meq 100 $g^{-1}$.

7. A material according to claim 1 wherein interstitial sites of the structure are occupied by two or more cations of which at least one is alkali metal.

8. A material according to claim 1 which in a pure, dehydrated form has the composition $M_pAl_qSi_{1-q}O_rsH_2O$ where M=alkali metal, $0.0<p\leq2.0$, $0.0<q<1.0$, $1.5\leq r\leq3.0$ and $0.1\leq s\leq0.1$.

9. A material according to claim 1 wherein the alkali cation can be exchanged partly or fully by one or more cations selected from the group comprising: the alkalis $Li^+$, $Na^+$, $K^+$, $Rb^+$, $Cs^+$; ammonium $NH_4^+$; the alkaline earths $Ca^{2+}$, $Mg^{2+}$, $Sr^{2+}$; the transition metals $Cr^{3+}$, $Mn^{2+}$, $Fe^{2+}$, $Fe^{3+}$, $Ag^+$, $Cu^{2+}$, $Ni^{2+}$, $Co^{2+}$; the other metals $Al^{3+}$, $Zn^{2+}$, $Cd^{2+}$, $Pb^{2+}$ and, $Hg^{2+}$; the lanthanides $Nd^{3+}$ and $Ln^{3+}$, and the uranyl $UO_2^{2+}$.

10. A material according to claim 9 which is highly selective in its cation exchange towards one or more of the aqueous cations selected from the group comprising $Ca^{2+}$, $Al^{3+}$, $Cu^{2+}$, $Ni^{2+}$, $Co^{2+}$, $Ag^+$, $Fe^{2+}$, $Cr^{3+}$, $Zn^{2+}$, $Cd^{2+}$ and $Pb^{2+}$.

11. A material according to claim 9 which is selective in its cation exchange towards the aqueous cations $Ca^{2+}$, $Mg^{2+}$, $Sr^{2+}$, $Al^{3+}$, $Cu^{2+}$, $Ni^{2+}$, $Co^{2+}$, $Ag^+$, $Fe^{2+}$, $Cr^{3+}$, $Mn^{2+}$, $Zn^{2+}$, $Cd^{2+}$, $Pb^{2+}$, $Hg^{2+}$, $Nd^{3+}$, $Ln^{3+}$ and $UO_2^{2+}$.

12. A material according to claim 1 which has been subjected to partial or full exchange of the alkali metal cation by at least one cation selected from the group comprising: the alkalis $Li^+$, $Na^+$, $K^+$, $Rb^+$, $Cs^+$; ammonium $NH_4^+$; the alkaline earths $Ca^{2+}$, $Mg^{2+}$, $Sr^{2+}$, the transition metals $Cr^{3+}$, $Mn^{2+}$, $Fe^{2+}$, $Fe^{3+}$, $Ag^+$, $Cu^{2+}$, $Ni^{2+}$, $Co^{2+}$; the other metals $Al^{3+}$, $Zn^{2+}$, $Cd^{2+}$, $Pb^{2+}$ and $Hg^{2+}$; the lanthanides $Nd^{3+}$ and $Ln^{3+}$, and the uranyl $UO_2^{2+}$.

13. A process for the preparation of a poorly or partly crsytalline alkali metal aluminosilicate material having a stuffed silica polymorph related-structure in which the aluminium is at least predominantly tetrahedrally coordinated and a cation exchange capacity at room temperature of at least 1 meq 100 $g^{-1}$ in aqueous solution, in which an aluminosilicate, or a combination of aluminium oxide-containing and silicon oxide-containing compounds, are reacted together with an alkali oxide-containing reagent.

14. A process according to claim 13 which is performed at a temperature of 750° C. or less.

15. A process according to claim 14 wherein the reaction is performed at a temperature in the range of 300 to 750° C.

16. A process according to claim 13 wherein the alkali oxide containing reagent decomposes in air at a temperature below 1000° C. to give alkali oxide.

17. A process according to claim 16 wherein the alkali oxide-containing reagent is a carbonate or hydroxide.

18. A process according to claim 16 wherein the alkali oxide-containing reagent is a bicarbonate, nitrate, or carboxylate.

19. A process according to claim 13 wherein the aluminosilicate is a phyllosilicate.

20. A process according to claim 19 wherein the phyllosilicate is a kaolin group mineral.

21. A process according to claim 19 wherein the phyllosilicate is montmorillonite or pyrophyllite.

22. A process according to claim 13 which involves a solid state reaction.

* * * * *

UNITED STATES PATENT AND TRADEMARK OFFICE
CERTIFICATE OF CORRECTION

PATENT NO : 5,958,354
DATED : September 28, 1999
INVENTOR(S) : Thompson et al.

It is certified that error appears in the above-identified patent and that said Letters Patent are hereby corrected as shown below:

ON THE COVER PAGE:

[73] Assignee: Australia National University of Acton, Australia

Signed and Sealed this

Third Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO.    : 5,958,354
DATED         : September 28, 1999
INVENTOR(S)   : Thompson et al.

It is certified that error appears in the above-identified patent and that said Letters Patent is hereby corrected as shown below:

<u>Title page,</u>
Insert Item [73], as follows:

-- [73] Assignee: Australian National University of Acton, Australia --

Signed and Sealed this

Twenty-first Day of January, 2003

JAMES E. ROGAN
*Director of the United States Patent and Trademark Office*